United States Patent
Brichta et al.

(10) Patent No.: US 7,113,923 B1
(45) Date of Patent: Sep. 26, 2006

(54) SYSTEM AND METHOD OF MANAGING AN OFFICE OF PROGRAMS

(75) Inventors: Harriet E. Brichta, Plano, TX (US); Floyd Phillip Littlefield, Jr., Wylie, TX (US); Bruce W. Bradbury, Allen, TX (US); Iveoma C. Eriken, Carrollton, TX (US); Julio A. Rodriguez, Garland, TX (US)

(73) Assignee: Electronic Data Systems Corporation, Plano, TX (US)

( * ) Notice: Subject to any disclaimer, the term of this patent is extended or adjusted under 35 U.S.C. 154(b) by 641 days.

(21) Appl. No.: 09/244,550

(22) Filed: Feb. 3, 1999

(51) Int. Cl.
*G06Q 30/00* (2006.01)
(52) U.S. Cl. ...................................................... 705/35
(58) Field of Classification Search .................. 707/1, 707/2, 3, 4, 10, 102, 103; 705/35, 8, 9, 10; 702/100, 10
See application file for complete search history.

(56) References Cited

U.S. PATENT DOCUMENTS 5,765,140 A * 6/1998 Knudson et al. ............. 705/9
5,826,252 A * 10/1998 Wolters, Jr. et al. ........... 707/1

OTHER PUBLICATIONS

Senn, James A., "Analysis and Design of Information Systems, Second Edition", McGraw-Hill Publishing Company, 1984, pp. 800-804.*
Duncan, William R., "A Guide to the Project Management Body of Knowledge", PMI Publishing, 1996. pp. 61.*
Lowery, Gwen, "Managing Projects with Microsoft Project 4.0 For Windows and Macintosh", International Thompson Publishing Company, 1994, pp. 11-25, 65-73, and 301-306.*

Bates, William S., "*Improving Project Management: Better Project Management Begins with a Project Management Office*", Institute of Industrial Engineers Inc Solutions, v. 39:n10, p. 42, Oct. 1998.
Brown, Eryn, "*VF Corp. Changes Its Underware*", Fortune, pp. 115-118, Dec. 7, 1998.
DeYoung-Currey, Jane, PMP, "*Want Better Project Estimates? Let's Get to Work! Management's Role in Better Estimating*", PM Network, pp. 14-16, Dec. 1998.

(Continued)

*Primary Examiner*—Donald L. Champagne
(74) *Attorney, Agent, or Firm*—Baker Botts L.L.P.

(57) ABSTRACT

A system for managing at least one program including a plurality of projects for at least one organizational unit includes at least one program office database which stores informational data associated with the accounts, projects, and programs; financial data associated with the accounts, projects, and programs; schedule and progress data associated with the accounts, projects, and programs; personnel data associated with persons having responsibility associated with the accounts, projects, and programs, the personnel data including a unique person identifier for each person; security data having an assignment of at least one role to each person and an assignment of at least one update authorization to certain persons having oversight responsibility; data associated with translating progress milestones defined in the projects to tactics defined in the system; and update data associated with the progress and actual expenditures of the accounts, projects, and programs. The system further includes at least one user interface operable to display and allow access to the data stored in the program office according to a predetermined security scheme based on the person identifier, role and update authorization assignment stored in the at least one program office database, and further operable to receive the update data on a periodic basis.

55 Claims, 33 Drawing Sheets

OTHER PUBLICATIONS

Dinsmore, Paul C., PMP, "*A Journey Through Never-Never Land From Business Planning to Project Implementation*", PM Network, pp. 23-25, Dec. 1998.

Hamel Gary and Jeff Sampler, "*The E-Corporation More than just Web-Based, it's Building a New Industrial Order*", Fortune, pp. 81-92, Dec. 7, 1998.

Hannon, Brian, "*Framework Activates Project Management*", PC Week, v15:n24, p. 16, Jun. 15, 1998.

Kirkpatrick, David, "*The E-Ware War Competition Comes to Enterprise Software*", Fortune, pp. 102-112, Dec. 7, 1998.

Schonfeld, Erick, "*Schwab Puts It All Online*", Fortune, pp. 94-100, Dec. 7, 1998.

Stackpole, Beth, "*Portfolios: The Next Wave for Project Management*", PC Week, v15:n35, p. 67, Aug. 31, 1998.

Walker, Christy, "*App Helps Manage Project Schedules, Resources*", PC Week, v15:n50, pp. 100, Dec. 14, 1998.

Projects Management Institute Standards Committee, "*A Guide to the Project Management Body of Knowledge*", pp. 7, 41, 48, 60, 74, 84, 94, 104, 108-109, 112, 124, and 167, 1996.

EDS Project Management Consulting, "*Project Management Software Selection Toolkit*", pp. 1-24, Jan. 19, 1999.

"*Organization Tools*", PC Magazine, p. 104, Jan. 19, 1999.

* cited by examiner

Assign New Roles

| Assign Person | Business Unit | Role to Assign |
|---|---|---|
| ▼ | ▼ | ▼ |
| ▼ | ▼ | ▼ |
| ▼ | ▼ | ▼ |
| ▼ | ▼ | ▼ |

[ADD PERSON] [DONE]

EDS                                   Forecasts

Account Name   XYZ Company

Overall Totals

| Totals | 0 | 0 | 0 | 0 |
|---|---|---|---|---|

Forecast by Month

| Months | Non Y2K Revenues | Non Y2K Expenses | Y2K Revenues | Y2K Non Proj. Expenses |
|---|---|---|---|---|
| 1/1998 | 0 | 0 | 0 | 0 |
| 2/1998 | 0 | 0 | 0 | 0 |
| 3/1998 | 0 | 0 | 0 | 0 |
| 4/1998 | 0 | 0 | 0 | 0 |
| 5/1998 | 0 | 0 | 0 | 0 |
| 6/1998 | 0 | 0 | 0 | 0 |
| 7/1998 | 0 | 0 | 0 | 0 |
| 8/1998 | 0 | 0 | 0 | 0 |
| 9/1998 | 0 | 0 | 0 | 0 |
| 10/1998 | 0 | 0 | 0 | 0 |
| 11/1998 | 0 | 0 | 0 | 0 |
| 12/1998 | 0 | 0 | 0 | 0 |
| 1/1999 | 0 | 0 | 0 | 0 |

EDS     Actuals

Account Name   XYZ Company

Actual Expenditures

| Months | Non Y2K Revenues | Non Y2K Expenses | Y2K Revenues | Y2K Non Proj. Expenses |
|---|---|---|---|---|
| 1/1999 | 0 | 0 | 0 | 0 |
| 12/1998 | 0 | 0 | 0 | 0 |
| 12/1997 | 0 | 0 | 0 | 0 |
| 12/1996 | 0 | 0 | 0 | 0 |
| 12/1995 | 0 | 0 | 0 | 0 |
| 12/1994 | 0 | 0 | 0 | 0 |
| 12/1993 | 0 | 0 | 0 | 0 |
| 12/1992 | 0 | 0 | 0 | 0 |
| 12/1991 | 0 | 0 | 0 | 0 |
| 12/1990 | 0 | 0 | 0 | 0 |
| 12/1989 | 0 | 0 | 0 | 0 |
| 12/1988 | 0 | 0 | 0 | 0 |
| 12/1987 | 0 | 0 | 0 | 0 |
| Current Totals | 0 | 0 | 0 | 0 |

*FIG. 13*

| EDS | Update Account Actuals |
| --- | --- | home

Click the 0$ check box if no data (zero) is to be reported for this month. This will remove the month from the worklist.

Account Name   Account X
Account ID   1429

| Months | NonY2kRev.$ | NonY2kExp.$ | Y2K Rev.$ | Y2kNonProjExp | 0$ |
| --- | --- | --- | --- | --- | --- |
| 10/1998 | 0 | 0 | 0 | 0 | ☐ |
| 11/1998 | 0 | 0 | 0 | 0 | ☐ |
| 12/1998 | 0 | 0 | 0 | 0 | ☐ |

Account Name   Account Y
Account ID   1431

| Months | NonY2kRev.$ | NonY2kExp.$ | Y2K Rev.$ | Y2kNonProjExp | 0$ |
| --- | --- | --- | --- | --- | --- |
| 10/1998 | 0 | 0 | 0 | 0 | ☐ |
| 11/1998 | 0 | 0 | 0 | 0 | ☐ |
| 12/1998 | 0 | 0 | 0 | 0 | ☐ |

*FIG. 14*

Add Project

| | |
|---|---|
| Project Name | Project Project ABC |
| Functional Area | Services provided to external customers ▼ |
| Country | Argentina ▼ |

*Argentina is not the default, it's just the first country in the list. Select the correct country.*

Weights

| Process | Impact |
|---|---|
| Lead | No impact ▼ |
| Plan | No impact ▼ |
| Manage | No impact ▼ |
| Market | No impact ▼ |
| Sell | No impact ▼ |
| Deliver | No impact ▼ |

Projecting Notes [                    ]

[ Next ] [ Cancel ]

Project Milestone Data

Project Name: Project X
Tactic: Repair Existing System

*The number of milestones depends on the chosen tactic.*

Milestone Dates and Percent Completed

| Milestones | Target Start | Actual Start | Target End | Actual End | % Completed |
|---|---|---|---|---|---|
| Assess | | | | | 0 |
| Modification | | | | | 0 |
| Test | | | | | 0 |
| Implement | | | | | 0 |

Date Format: MM/DD/YYYY

[ Next ] [ Cancel ]

*FIG. 15D*

| EDS | | Project Forecasts | | | |
|---|---|---|---|---|---|
| | | | | | home |

Project Name   Project X

| Overall Totals | Totals | 0 | 0 | 0 | 0 | 0 |
|---|---|---|---|---|---|---|
| Forecast by Month | Months | Hardware $ | Software $ | Labor $ | Other $ | FTEs |
| | 1/1999 | 0 | 0 | 0 | 0 | 0 |
| | 2/1999 | 0 | 0 | 0 | 0 | 0 |
| | 3/1999 | 0 | 0 | 0 | 0 | 0 |
| | 4/1999 | 0 | 0 | 0 | 0 | 0 |
| | 5/1999 | 0 | 0 | 0 | 0 | 0 |
| | 6/1999 | 0 | 0 | 0 | 0 | 0 |
| | 7/1999 | 0 | 0 | 0 | 0 | 0 |
| | Current Totals | 0 | 0 | 0 | 0 | 0 |

[Next] [Cancel]

FIG. 15E

| EDS | | Project Actuals | | | |
|---|---|---|---|---|---|
| | | | | | home |

Project Name   Project X

| Actual Expenditures | Months | Hardware $ | Software $ | Labor $ | Other $ | FTE (Mth) |
|---|---|---|---|---|---|---|
| | 1/1999 | 0 | 0 | 0 | 0 | 0 |
| | Current Totals | 0 | 0 | 0 | 0 | 0 |

[Next] [Cancel]

FIG. 15F

| EDS | Update Budget and Labor Actuals |
| --- | --- |
| | home |

Project Name Project A
Project ID 12
Project Code 12

| Months | Hardware $ | Software $ | Labor $ | Other $ | FTE (Months) | 0$ |
|---|---|---|---|---|---|---|
| 1/1999 | 0 | 0 | 0 | 0 | 0 | ☐ |

Project Name Project B
Project ID 15
Project Code 16

| Months | Hardware $ | Software $ | Labor $ | Other $ | FTE (Months) | 0$ |
|---|---|---|---|---|---|---|
| 1/1999 | 0 | 0 | 0 | 0 | 0 | ☐ |

Project Name Project C
Project ID 22
Project Code 23

| Months | Hardware $ | Software $ | Labor $ | Other $ | FTE (Months) | 0$ |
|---|---|---|---|---|---|---|
| 1/1999 | 0 | 0 | 0 | 0 | 0 | ☐ |

Project Name Project D
Project ID 26
Project Code 27

| Months | Hardware $ | Software $ | Labor $ | Other $ | FTE (Months) | 0$ |
|---|---|---|---|---|---|---|
| 1/1999 | 0 | 0 | 0 | 0 | 0 | ☐ |

Click the 0$ check box if the costs were zero or no FTEs were used for the month. This will remove the items from your worklist.

FIG. 16

| Project Forecasts | | | | | |
|---|---|---|---|---|---|

Project ID: 1    [Return to Project]

| Month | Hardware | Software | Labor | Other | FTEs |
|---|---|---|---|---|---|
| 9/1/98 | $0.00 | $0.00 | $76.92 | $0.00 | 0 |
| 8/1/98 | $0.00 | $0.00 | $76.92 | $0.00 | 0 |
| 7/1/98 | $0.00 | $0.00 | $76.92 | $0.00 | 0 |
| 6/1/98 | $0.00 | $0.00 | $76.92 | $0.00 | 0 |
| 5/1/98 | $0.00 | $0.00 | $76.92 | $0.00 | 0 |
| 4/1/98 | $0.00 | $0.00 | $76.92 | $0.00 | 0 |
| 3/1/98 | $0.00 | $0.00 | $76.92 | $0.00 | 0 |
| 2/1/98 | $0.00 | $0.00 | $76.92 | $0.00 | 0 |
| 1/1/98 | $0.00 | $0.00 | $76.92 | $0.00 | 0 |

*FIG. 26*

SYSTEM AND METHOD OF MANAGING AN OFFICE OF PROGRAMS

TECHNICAL FIELD OF THE INVENTION

This invention is related in general to the field of computer software systems, and more particularly, to a system and method of managing an office of programs.

BACKGROUND OF THE INVENTION

Large broad-scale programs that change particular aspects of the operation of a corporation pose significant challenges especially for those corporations that are geographically dispersed and functionally heterogenous. Change is an inevitable aspect of growth, but change must be implemented in a controlled fashion with minimal impact to production and throughput.

In many organizations, rather than micro-managing the change programs high in the organizational hierarchy, the responsibility is delegated down the chain of command. Downward delegation of the change oversight responsibility has many negative side-effects. First, major differences in regional policies may emerge. Second, decentralized change oversight can result in redundancies and inefficiencies. Even more importantly, decentralized change oversight may disadvantageously remove the organization's capability to manage costs, schedules, and resources globally across the entire organization.

Known project management methodologies provide substantial value in managing change at a micro-level. Some project management programs such as Microsoft Project™, Computer Associate's Super Project™, and SAP™, attempt to integrate projects to produce a consolidated view. However, these programs are very limited. By far, the most restrictive feature of conventional project management programs requires all participating business units to use identical project management methodology, often with identically defined parameters. In the real world, such limitations are impractical and difficult to implement for an international organization of any meaningful size. Furthermore, such restrictions would be useless for consolidating the management of programs of existing projects.

SUMMARY OF THE INVENTION

It has been recognized that it is desirable to provide a program office management system and method that provide a corporation the capability to manage costs, schedules and resources from a micro- to a macro-level globally across the entire organization. The term "program office" or an office of programs is defined as an office or corporate entity that is responsible for managing, coordinating and delivering one or more mission critical functionalities or programs. A "program" is a collection of related projects. An example of a program is one that identifies and remediates systems that process century-date data incorrectly in the organization. The program office management system and method of the present invention function independently of project management methodology and data source which enable the incorporation and integration of pre-existing data and data sources in different formats.

In one aspect of the invention, a program office management system includes a program office database which stores:
informational data associated with accounts, projects, and programs;
financial data associated with the accounts, projects, and programs;
schedule and progress data associated with the accounts, projects, and programs;
data associated with personnel, roles, and security access information thereof;
data associated with translating progress milestones and tactics to reporting categories; and
update data associated with the progress, actual expenditures, and labor resources of the accounts, projects, and programs;

The system further includes a user interface operable to display data stored in the program office according to a predetermined security scheme based on the security access information stored in the program office database, and further operable to receive the update data on a periodic basis.

In another aspect of the invention, a method of managing a program office includes the steps of storing and accessing data associated with at least one project in a program office database, including informational data, financial data, schedule and progress data associated with the at least one project; storing update data associated with the at least one project; identifying persons associated with the at least one project, assigning at least one role relevant to the at least one project to each person, and storing data associated with the persons and their assigned roles in the program office database; and mapping tactic and milestones defined in the at least one project to tactic types and milestone categories defined in the program office database for reporting purposes.

In yet another aspect of the invention, a system for managing at least one program including a plurality of projects for at least one account are provided. The system includes at least one program office database which stores:
informational data associated with the accounts, projects, and programs;
financial data associated with the accounts, projects, and programs;
schedule and progress data associated with the accounts, projects, and programs;
personnel data associated with persons having responsibility associated with the accounts, projects, and programs, the personnel data including a unique person identifier for each person;
security data having an assignment of at least one role to each person and an assignment of at least one update authorization to certain persons having oversight responsibility;
data associated with translating progress milestones defined in the projects to tactics defined in the system; and
update data associated with the progress, actual expenditures, and labor resources of the accounts, projects, and programs;

The system further includes at least one user interface operable to display and allow access to the data stored in the program office according to a predetermined security scheme based on the person identifier, role and update authorization assignment stored in the at least one program office database, and further operable to receive the update data on a periodic basis.

One technical advantage of the invention is that there is no requirement of using identical project management methodology or data sources. Milestones unique to particular projects may be translated to industry standard milestones appropriate for the program(s). Organizational costs, schedules and resources can be managed and controlled across the organization on many levels. Further, access to system data is securely and strictly controlled based on a user's identifier, the user's role(s), and authorization levels. Another technical advantage of the present invention is the ability to archive seemingly limitless project history with minimal data storage. Priority can be assigned to projects in the entire organization to allocate resources.

BRIEF DESCRIPTION OF THE DRAWINGS

For a better understanding of the present invention, reference may be made to the accompanying drawings, in which:

FIG. 9 is an exemplary view of an assign role screen of the web user interface;

FIG. 11 is an exemplary view of an add account screen of the web user interface;

FIG. 12 is an exemplary view of an account forecast screen of the web user interface;

FIG. 13 is an exemplary view of an account actuals screen of the web user interface;

FIG. 14 is an exemplary view of an update account actuals screen of the web user interface;

FIGS. 15A–15F are an exemplary views of add project screens of the web user interface;

FIG. 16 is an exemplary view of an update budget and labor actuals screen of the web user interface;

FIG. 26 is an exemplary view of a screen for viewing project forecasts via the program office interface;

DETAILED DESCRIPTION OF THE INVENTION

Figure 1:
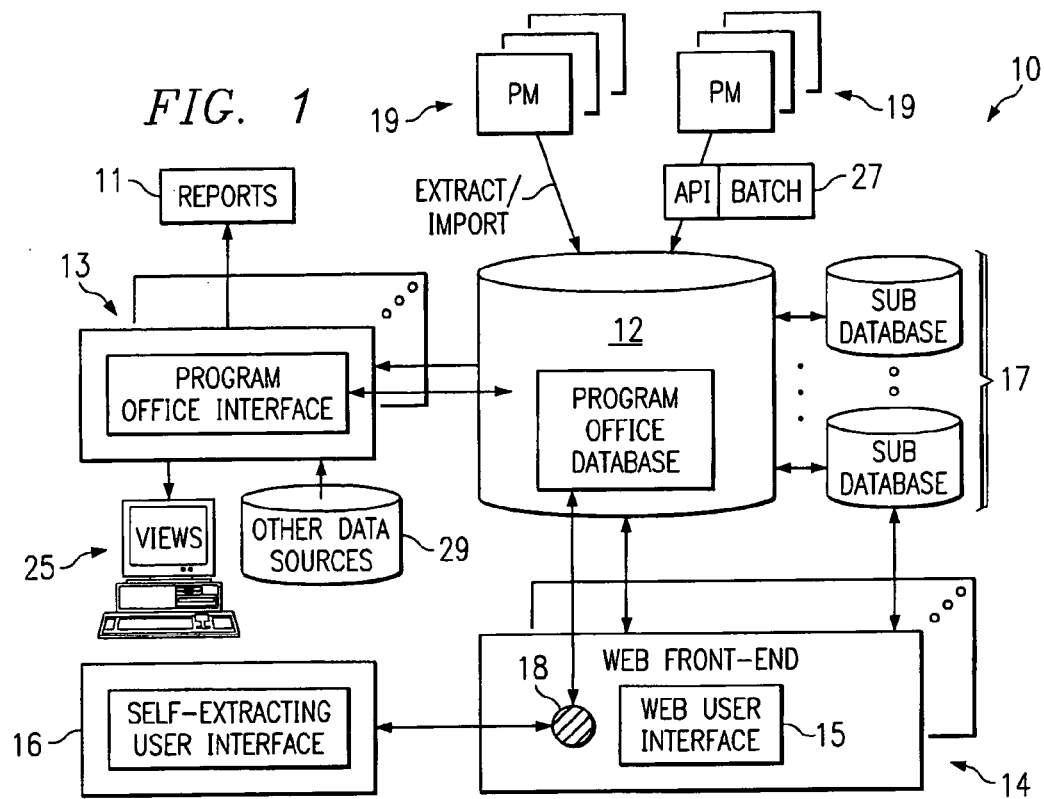
FIG. 1 is a top level block diagram of an embodiment of the present invention.

Referring to FIG. 1, a block diagram of an embodiment of the system and method of managing a program office 10 of the present invention is shown. System 10 includes a program office database 12, which includes a data structure having tables and data fields storing data used in the present invention. Relational database, or object-oriented database, object-relational database or any other suitable database scheme may be used. The data structure and the data are described in more detail below. One or more program office interfaces 13 may be used to access, update, view, and retrieve data residing in program office database 12. Program office interface 13 is primarily used by upper level management, internal auditors, and external auditors. A front-end 14 including user interfaces 15 and 16 are provided to users to primarily submit update data to program office database 12. In an exemplary embodiment, front-end 14 may be web-based as well as user interface 15. At least one web user interface 15 allows users to primarily add, change or update people information, account information, and project information. Web user interface 15 runs on a web server as a web browser-based system. User interface 16 is a self-extracting user interface that may be a spread sheet-based interface that is capable of running on a computer system with minimal system requirements. One or more sub-databases 17 may be substantial duplicate copies or a subset of program office database 12. Sub-databases 17 may be accessible by one or more web front-ends 14 and their respective web user interfaces and self-extracting user interfaces, which may be located geographically remote from program office database 12.

Program office database 12 may be electronically linked to other project management tools 19 or other data sources 29 to extract or import data. This database access may be achieved by open database connectivity (ODBC) using structured query language (SQL) or another suitable query language. Program office database 12 may include logic tables or logical views of certain data fields in program office database 12 and data tables encompassed in project management tools 19 and/or other data sources 29. These views, when executed, retrieve the data from these data fields and data tables from project management tools 19 and/or other data sources to program office database 12. Alternatively, application program interfaces (API) 27 tailored to the specific project management tools 19 may be provided for accessing data stored therein. In this manner, it is not necessary to duplicate data already stored and maintained in project management tools 19 and other data sources 29 in program office database 12. The data may be imported into program office database 12 only when needed for viewing or reporting purposes.

The system of the present invention may also import data from other data sources 29 stored and maintained by other departments within the organization, such as human resources and cost accounting databases, to obtain data needed for reporting and auditing purposes. Program office interface 13 can therefore access the necessary data to independently verify and audit the actual and budget data from program office database 12.

Figure 2:
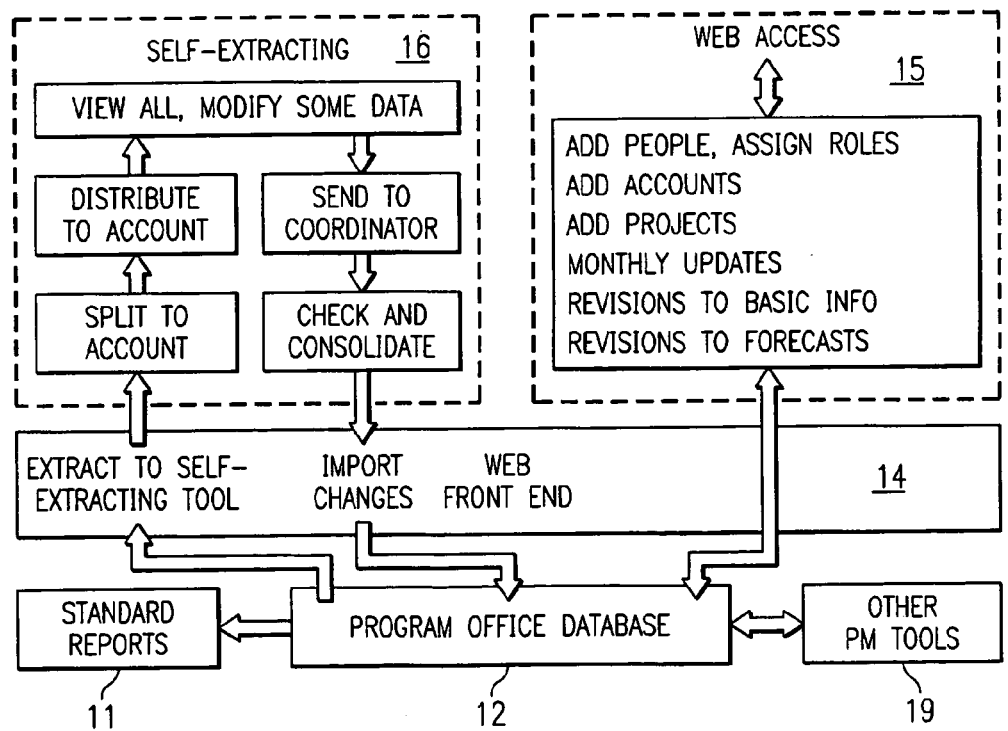
FIG. 2 is a more detailed block diagram of an embodiment of the present invention showing certain data update processes.

Referring to FIG. 2, a block diagram providing a more detailed description of some of the exemplary processes involved to update program office database 12 is shown. Using web user interface 15 through web front-end 14, a browser-based tool may be used to perform the functions shown: add people and assign roles, add accounts, add projects, provide periodic updates, revise basic information, and revise forecasts. Through web front-end 14, self-extracting user interface 16 may be obtained or extracted.

Figure 3:
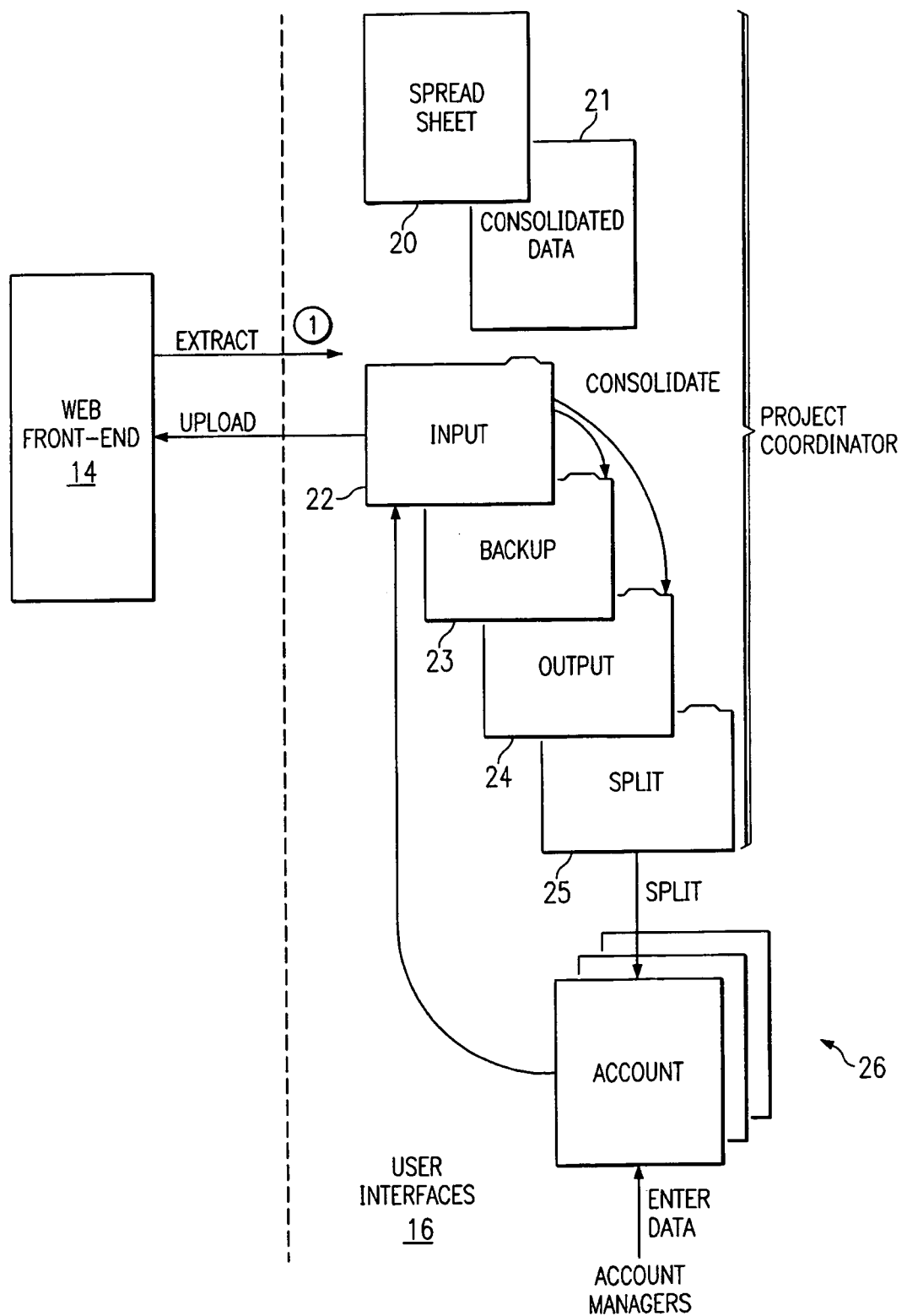
FIG. 3 is a block diagram showing the exemplary files and folders used and manipulated during an embodiment of the self-extracting data update processes.

Referring to both FIGS. 2 and 3, a person having a sufficiently senior role in a role hierarchy such as a coordinator 18 may select an extract function of web front-end 14 and extracts an executable of user interface 16. It is important to note that the roles described herein are merely examples, such as program manager, coordinator, project manager, and account manager, and these roles are representative of levels in a role hierarchy. In the role hierarchy, the roles are capable of performing increasing scope of functionality. For example, a coordinator is a project-level manager that may be assigned the authority to add people to program office database 12, assign roles for a business unit, and add projects and accounts for business units, but an account manager may not perform these same functions. User interface 16 may be a self-extracting executable file which may be based on a spread sheet application such as Microsoft Excel™.

The extracted user interface 16 may include two spread sheet files, a spread sheet file 20 with the coordinator's user identifier and a consolidated data file 21. The extracted user interface 16 may also include four folders: input folder 22, backup folder 23, output folder 24, and split folder 25. Split folder 25 holds individual account files extracted from web front-end 14. Split folder 25 is used to split into one or more account files 26, which are distributed to account managers who have oversight responsibilities of the accounts. Because some managers may have oversight responsibility of more than one account, the split account files for those managers will include one file for each account identified with the account manager's user identifier and a serial number to identify the account. The manner split account files 26 are distributed may be electronically via file transfer protocol, as an E-mail attachment, over a network, on a diskette, or any other means convenient to the responsible recipient and agreed upon between the requester and the responsible recipient. The account managers may then view and modify data according to the assigned security authorization. Typically, a periodic update is requested from the account managers, such as a monthly report of milestones reached, revise project forecasts, update budget and labor actual expenditures, and update schedule and progress.

After all the new and changed data are entered and modified, the account managers submit the update data. The result may be one or more text files that contains all the update data. These text files are put into input folder 22 by coordinator 18. Using web user interface 15, coordinator 18 also verifies that all account files 26 have been returned each time period by the subordinate managers. The returned account files in input folders 22 are automatically consolidated by activating the consolidate function in web user interface 15 and into a single file, which is then automatically transferred to output folder 24, and a copy of which is automatically stored in backup folder 23. After the consolidate process, coordinator 18 then uses web front-end 14 to import or upload the consolidated data files from output folder 24 to program office database 12. As shown in FIG. 2, reports 11 containing data from program office database 12 may be viewed, printed or displayed. Program office database 12 may also be linked to project management tools 19 to obtain or provide data.

Figure 4:
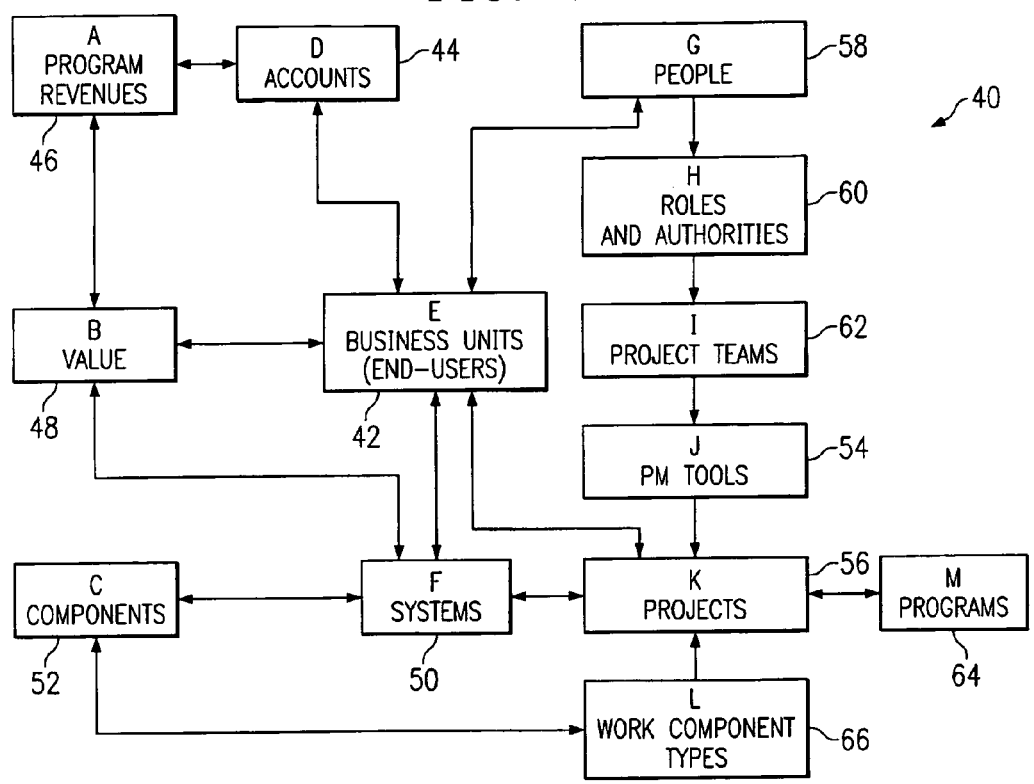
FIG. 4 is a schematic block diagram of a representation of components in a program office.

Referring to FIG. 4, a block diagram of an exemplary program office 40 under the management and control of the system and method of the present invention is shown. A corporation is made up of one or more business units 42. Each business unit 42 may have zero or more accounts 44 that contribute to the program cost recovery through the revenues 46 they generate on behalf of the program. These revenues 46 may be clearly distinguishable from revenues derived from other sources. The difference between the program revenues and expenses is hereinafter referred to as the program contribution for business unit 42. All business units 42 have a value 48 they contribute to the corporation that may be measured empirically through current revenues, earnings and profits, indirectly through forecasts of expected future revenues, earnings and profits, indirectly through delivery of support services utilized by the corporation, or by any other means deemed appropriate by the senior leadership of the corporation.

All business units 42 utilize one or more systems 50 to deliver value 48 to the corporation. Systems 50 may be evaluated and weighted in terms of how important they are in delivering value to the corporation. All systems 50 may include one or more identifiable components 52 of component types 54 which are remediated or changed by projects 56. A system 50 may be remediated or changed by one or more projects 56, and a project 56 may remediate or change one or more systems 50.

One or more business units 42 may be responsible for the cost of remediating or changing systems 50 through projects 56. These business units 42 are referred to as the business owners of projects 56. Business units 42 have people 58 that form project teams 62. Each person may be assigned one or more roles. The roles define the functionality that the role-holders may perform. However, the role-holders may perform these functionality only with the setting of an authority flag, or the update authority. The setting of the update authority flag or the granting of the update authority is the responsibility of senior level management personnel. Project teams 62 may utilize project management tools 64 to manage and complete projects 56 that remediate or change systems 50. In the present invention, project management tools 64 may be any tool using any project management methodology. In other words, all projects 56 may be managed by the present system and method regardless of the project management methodology.

Costs are aggregated across business units 42 by program 64 for financial accounting, fiscal audits, management oversight, and reporting. Projects 56 may belong to one or more programs 64. Projects 56 that are financially aggregated under one or more program 64 may have an impact on another program 64. If the financially liable programs are outside the scope of the program office, budgets, expenditures, and staffing need not be collected, although collection of such data may still be performed. However, all projects 56 impacting a program 64 may report project schedules and milestone progress, since they impact the overall success or failure of program 64.

Using the present invention, projects 56 may be prioritized in terms of the value they contribute to the corporation based on systems 50 changed by projects 56 as evaluated by business units 42 utilizing system 50 to deliver value 58. Projects 56 may also be prioritized in terms of the contingency costs associated with failure to deliver the project. Projects 56 may be aggregated in terms of the quantity and type of work components 52 required to deliver program 64. Shortages by component type can be predicted based on need and burn rate. Burn rate is a value that provides information on whether resources are expended efficiently in terms of the progress made so far and what remains to complete the project. Using the system and method of the present invention, it is possible to more easily recognize projects of similar functions undertaken by the organization that may be redundant or duplicative. Geographic areas may be examined to ensure they have adequate coverage of the critical functional areas required to conduct business and deliver program 64. Unknowns related to projects 56 may be readily detected and thus eliciting a call to action. Projects 56 that are lagging in schedule progress are readily identifiable and may be merged intelligently by function and/or geography as appropriate to deliver successful completion of program 64. Resources, including people 58, may be aligned to ensure completion of projects 56 with the highest priority.

Projects 56 may be remediated or changed using a variety of tactics. A tactic is a strategy or approach taken in the project to affect change. Tactics may be grouped into types. Examples of tactic types include repair, replace, outsource, retire, upgrade, and assess. Project management tools using different methodologies may define different tactics.

Milestones is a term that is used to measure progress and is evidenced by quantifiable and verifiable deliverables. A tactic therefore can be defined to have one or more milestones. Project management implementations using different methodologies may define different sets of milestones for their tactics.

In order to operate independently of different project management tools and methodologies and still be able to encompass the projects under the umbrella of the present system, the system and method of the present invention define milestone categories into which milestones defined in the project management tools may be mapped into. Examples of milestone categories may be assess, renovate, test, and implement. Corresponding to the milestone categories are tactic types defined in the present system and method. Tactic types can be defined in terms of the milestone categories required to complete a project of that tactic type. Therefore, a tactic defined in any project management tool can be categorized as a tactic type defined in the present system, and then mapped into milestone categories defined in the present system. This mapping provides a translation across terminology boundaries as well as language boundaries. Therefore, a project may continue to be managed under a project management tool using different methodologies, terminologies, as well as using the native language of the project management team. Furthermore, account managers and project managers may continue to use the same terminology and provide update data to the present system using the same terminology. The mechanism for implementing this mapping or translation process is described in more detail below.

People 58 fill one or more roles 60. Senior leadership such as a program manager may grant specific access and update authority to persons having specific roles with regard to specific projects in their business unit. Therefore, the granting of update authority is strictly controlled and can be performed only by senior management. One of the authorization levels granted is surrogate, which grants the grantee the same authorization as the grantor. Another authorization level is update authority, which gives the grantee the clearance to make changes or updates to certain data determined by the roles performed by the person. Using user identifiers, roles, and authorization levels, every step in every process is controlled based on rule, role and function. The rules of access are formulated based on roles of the user and the authorization level as well as the data manipulating function to be performed. Therefore, the data that people can view and modify is strictly defined and enforced. The rules used to enforce data integrity may be achieved with referential integrity tables, code implemented in a programming language, such as C++ or Visual Basic, or any other suitable mechanism. Client side validation is utilized in web user interface on data to be submitted to program office database 12 to improve performance while ensuring data validity. The mechanism to implement the rule, role and function-based security is described in more detail below.

Figure 5:
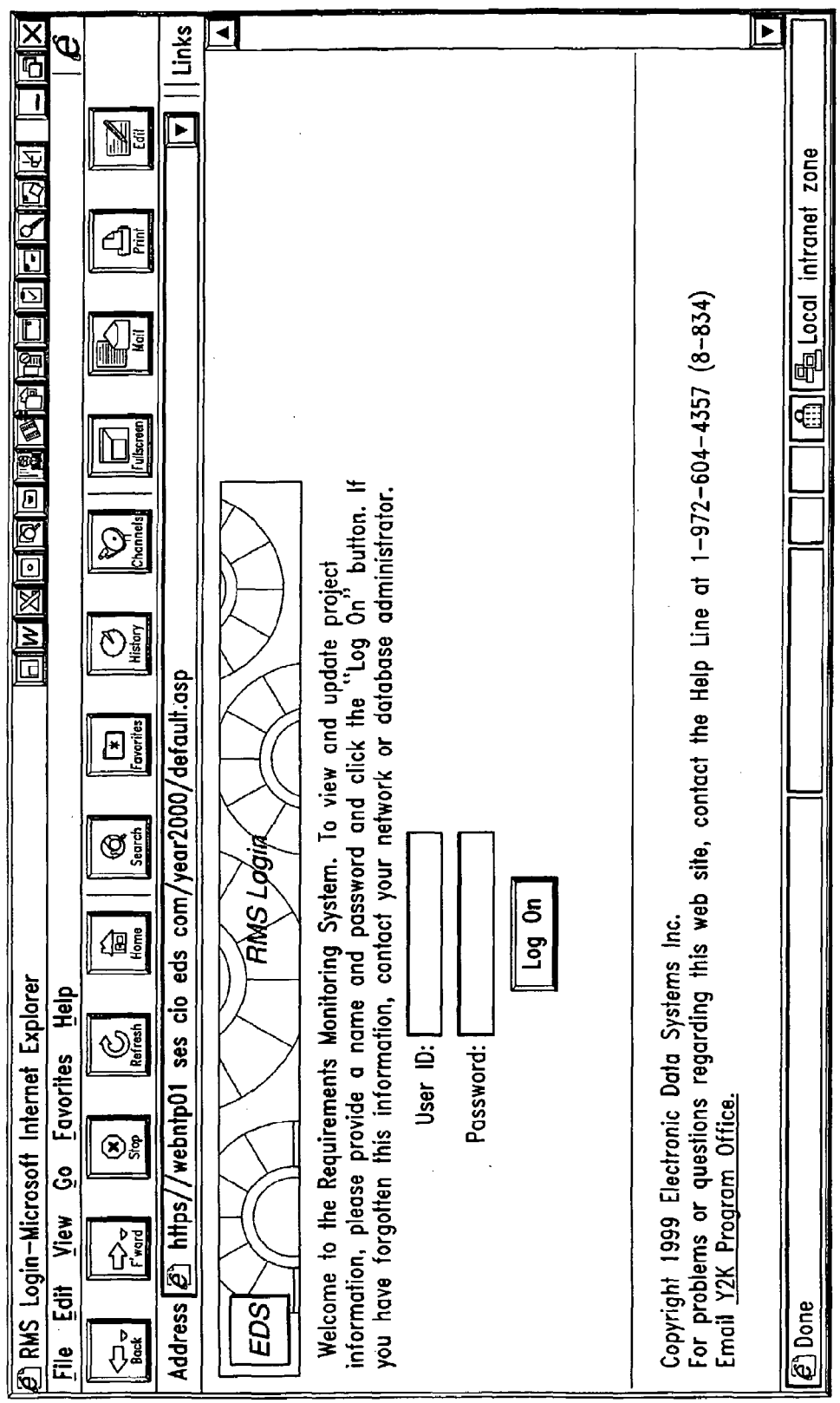
FIG. 5 is an exemplary view of a log in screen of the web user interface.

FIGS. 5–17 are sample screens of web user interface 15 which provide further insight on the construction and operation of the present invention. FIG. 5 is an exemplary screen of the login screen, which requests the user to enter the user identifier (ID) and a password. From the user identifier, the user's role in one or more accounts or projects may be determined, and further the authorization level assigned to the user in each account is determined.

Hereinafter the description is directed to several exemplary screens that may be seen by users via the end user interfaces 15 and 16 and via program office interface 13. In general, the accessibility of data within program office database 12 is dependent on the assigned role of the user, whether the user has update authority, and the function the user desires to perform. For example, no one except for persons having a role at the top of the role hierarchy may assign or change roles to people. A person having a particular role typically may only view or change data at or below him or her in the hierarchy, if so authorized by the update authorization flag. An example is that a project manager may be authorized to change data associated with accounts, but an account manager may not be authorized to change data associated with projects. On the other hand, a person can typically change data related to him or herself. Some data are viewable by persons of certain roles but other data are inaccessible to them. For example, a business owner may see progress data associated with a business unit under the oversight responsibility of another business owner, but the financial data are not available for view.

Figure 6:
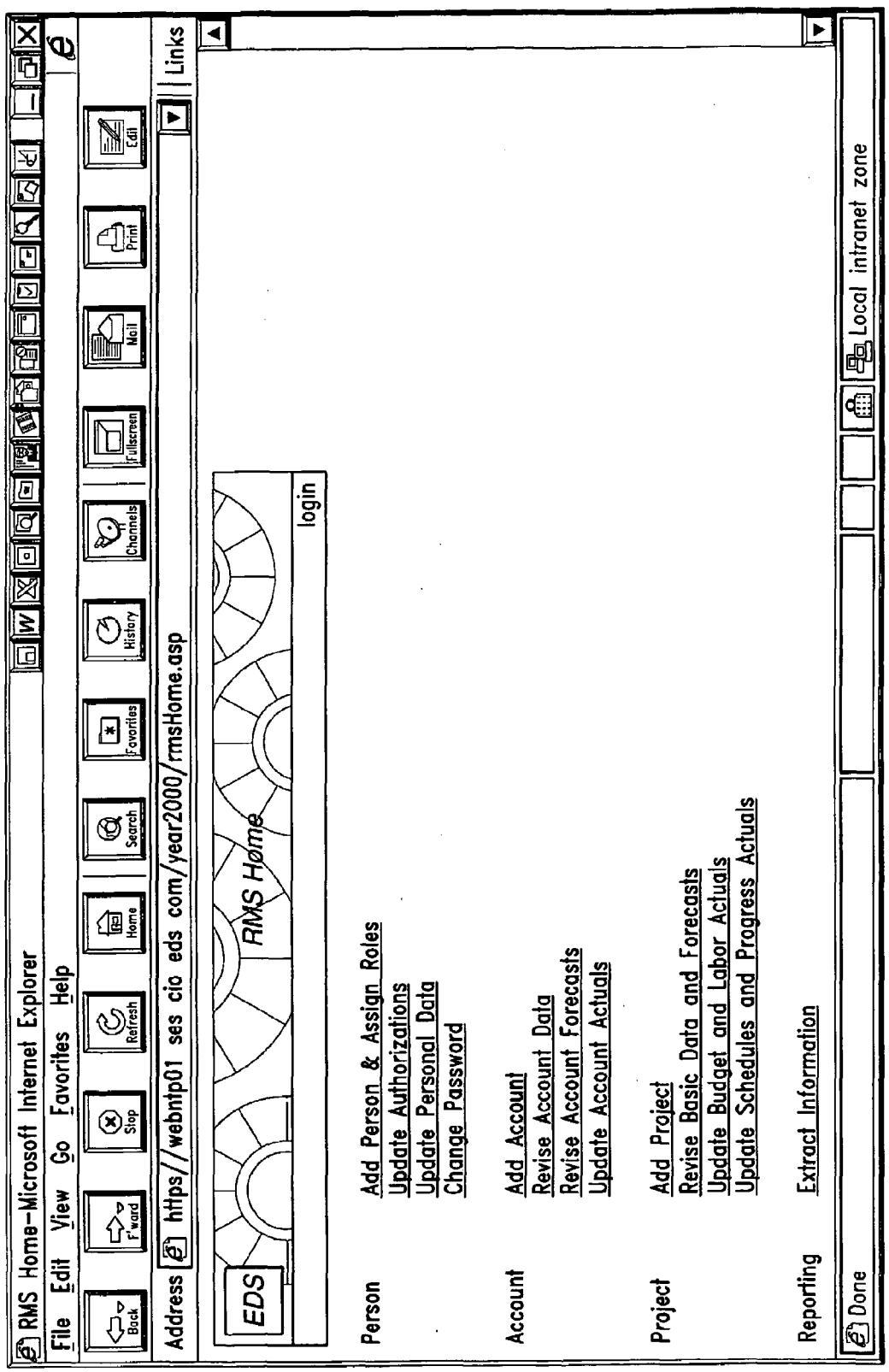
FIG. 6 is an exemplary view of a home page screen of the web user interface.

FIG. 6 is a exemplary screen of the home page of web user interface 15. Four primary functions are listed: people, account, project, and reporting. The people function is further broken down into the functions of adding persons and assign roles, update authorizations, update personal data, and change password. The account function is further broken down into the functions of add accounts, revise account data, revise account forecasts, and update account actuals (what changes to account data actually took place). The project function is further broken down into the functions of add projects, revise basic data and forecasts, update budget and labor actuals, and update schedules and progress actuals (what progress actually was achieved). The reporting function provides the function of extracting information from the database to put together reports or logical views of the data. Clicking on these functions links the user to a sub-page to carry out the functionality.

Figure 7:
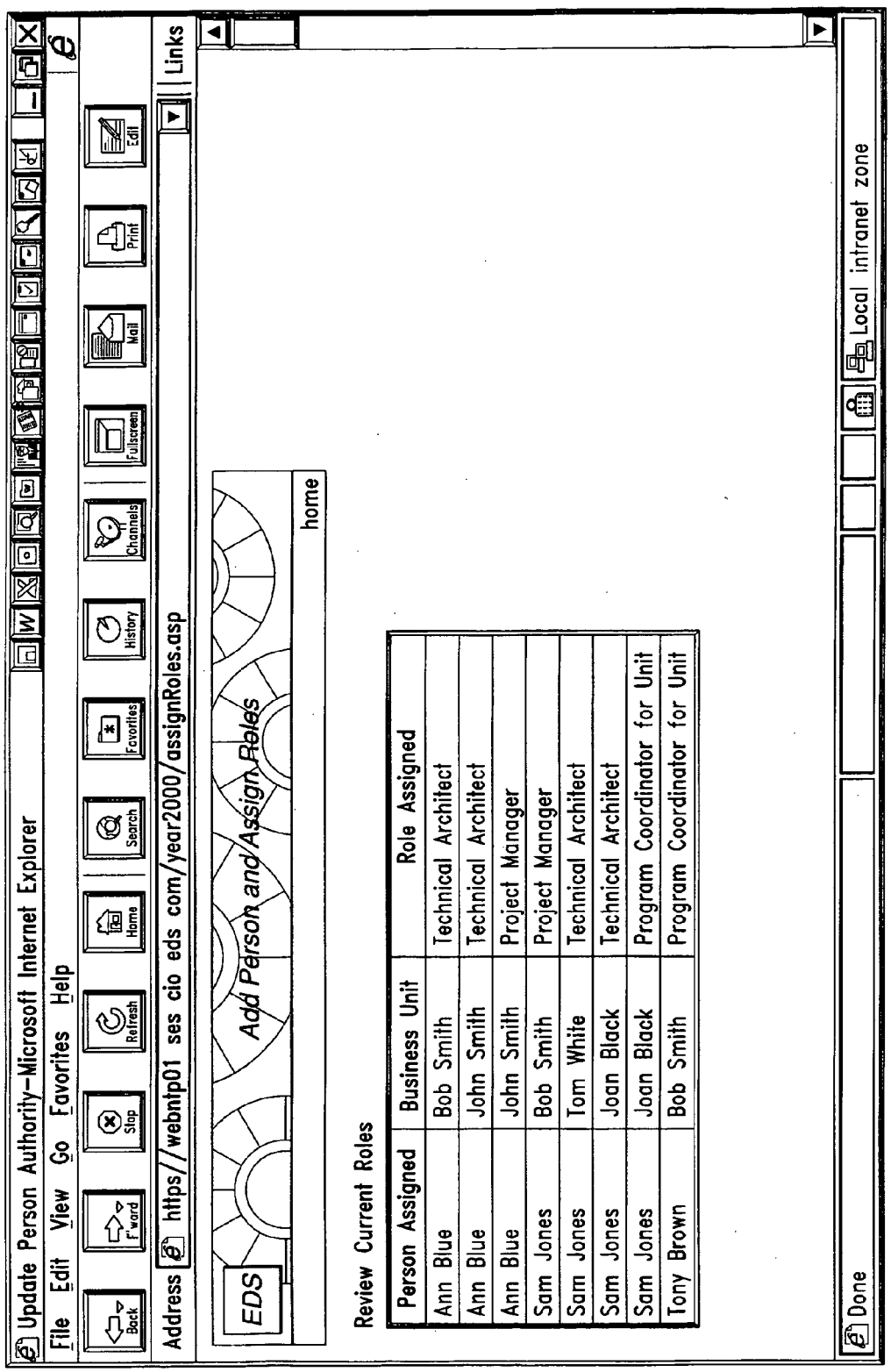
FIG. 7 is an exemplary view of an add person and assign roles screen of the web user interface.

For example, FIG. 7 shows an exemplary screen of a page under the add person and assign roles function. In this example, only persons with the following roles may be authorized to perform the add person and assign role functions: program manager, process coach, surrogate, coordinator. The authority to add persons and assign roles may be given by granting update authority to the persons with these roles by the senior executive.

In general, the ability to perform a function depends on the role of the person and whether that person has update authority granted by the senior executive. If given update authority, a program manager may add and update projects and account data for business units, add surrogates, set update authority within their domain, and view project progress for all business units. With update authority, a process coach generally may add surrogates, set update authority, and view project progress for all business units. A surrogate with update authority may generally add and update projects and accounts for all business units under the respective program manager, and view project progress for all business units. A coordinator with update authority may add people, assign roles, add projects and accounts for business units in a defined scope. Account managers, if granted update authority, may generally update data for accounts and projects for which they are assigned responsibility and was given authorization to do so by the program manager. A project manager with update authority may update project data for which they are assigned a role, if authorized by the program manager. A business manager or technical architect may view projects in which they are assigned a role.

FIG. 7 provides a list of persons in the project with the assigned roles for each person. It may be seen that certain persons have more than one assigned role. For example, Ann Blue is both a project manager and a technical architect for a business unit under the oversight of John Smith, as well as a technical architect for a business unit under the oversight of Bob Smith. Sam Jones serves the role of project manager, technical architect, and program coordinator for several business units.

Figure 8:
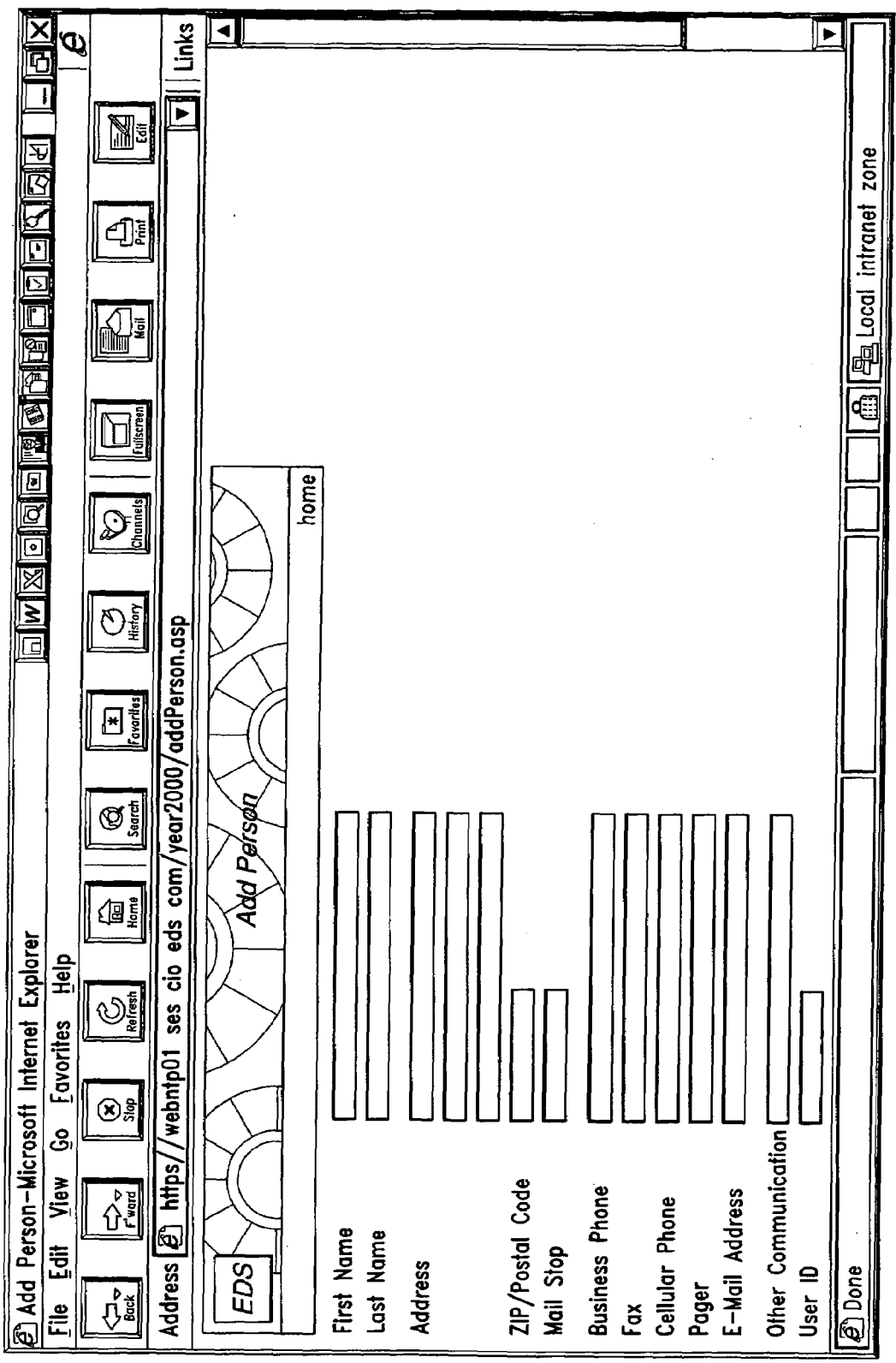
FIG. 8 is an exemplary view of an add person screen of the web user interface.

FIG. 8 is an exemplary screen of a web page to add a person to the system. Several data fields are provided to request relevant data associated with the person to be added, such as name, address, phone numbers, E-mail addresses, user identifier, etc. Persons are authorized to add persons and assign roles for subordinate role holders. For example, a program manager can add a coordinator. Also, each may add people and roles only if authorized by senior management. The permission to update is given by setting an update authority flag associated with the people with the proper roles defined within the business unit.

FIG. 9 is an exemplary screen of a web page to assign a new role to a person already defined in the system. Only program managers, process coaches, surrogates, and coordinators may be authorized to assign roles. In the Assign Person column, each data field has a drop-down list of names defined for the business units for which the requestor has edit capability. In the Business Unit column, again the business unit the person belongs to can be selected from the drop-down list of defined business units. This business unit list is limited to those on behalf of whom the requestor is authorized to act. Only those persons already added and defined for the specific business unit appear in the Assign Person drop-down list. The pull-down lists of roles only display those roles that the current user is authorized to assign, typically only those roles that are below the role of the user in the role hierarchy. Further, the pull-down list of business units only contains those business units on behalf of which the user is authorized to act as authorized by the user's role and update authority. Therefore, if the update authority flag associated with the user is not on or affirmative, then these pull-down lists will be empty.

Figure 10:
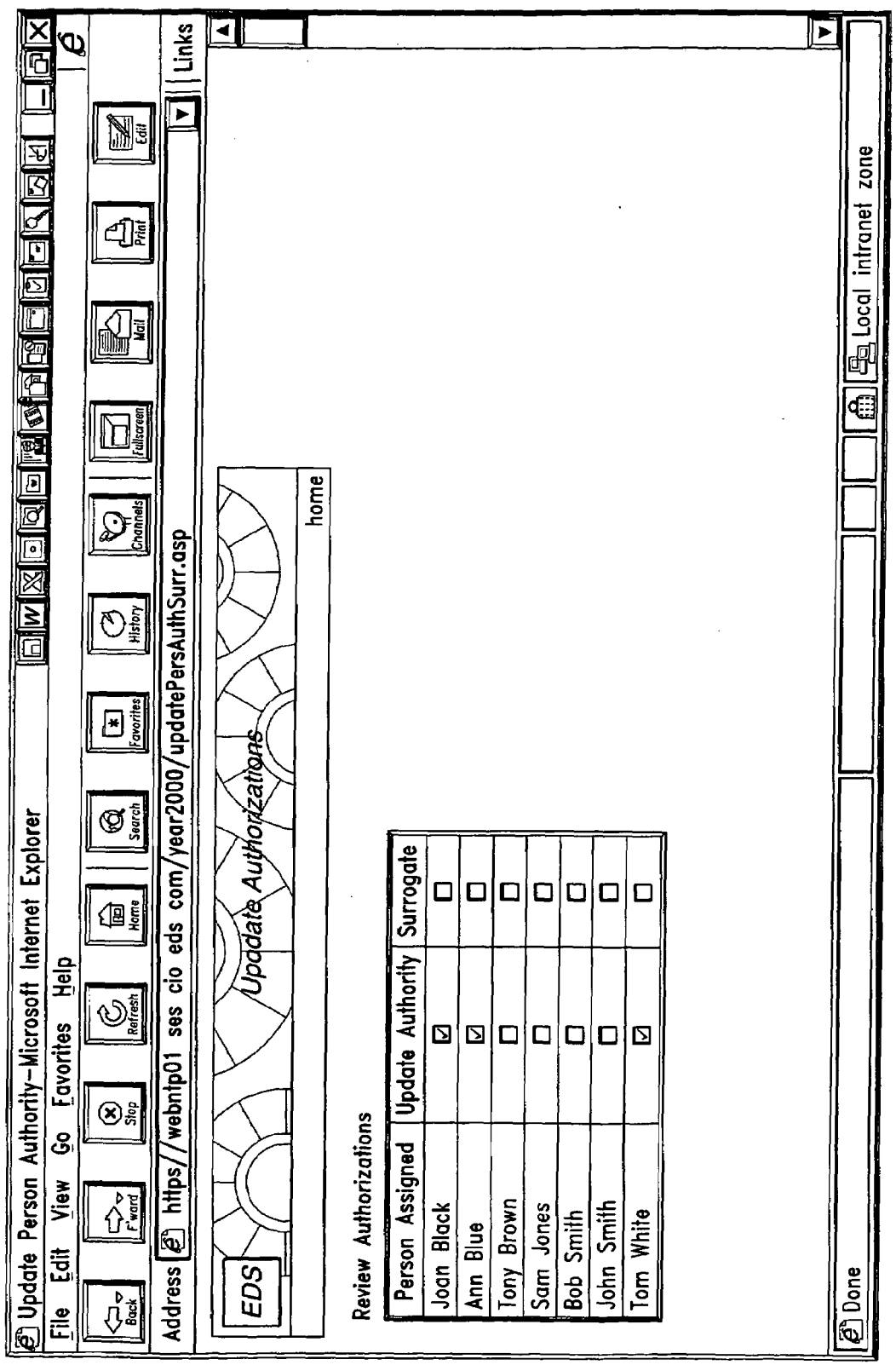
FIG. 10 is an exemplary view of an update authorizations screen of the web user interface.

FIG. 10 is an exemplary screen of a web page providing update authorization to the personnel. Only a person having sufficiently high seniority or a role high in the role hierarchy, such as a program manager, may be authorized to update authorizations. This person will be required to accept responsibility and accountability for the senior executive to act on behalf thereof. Therefore, this screen is off-limits and inaccessible to most people on the team. Two authorization permissions are shown, update authority and surrogate. As described above, a surrogate may act for a senior level manager such as a program manager. Therefore, the surrogate would have security clearance to access and change most of the data in program office database 12. However, even a surrogate would not have the authority to change the update authority of the personnel. Update authority would give the assigned person the ability to not only access the data but also to update or change it. However, the level of data the assigned person may update depends on the role of the person. For example, a project manager may only update project level data for which they are managers, and an account manager may only update account level data.

Figure 11:
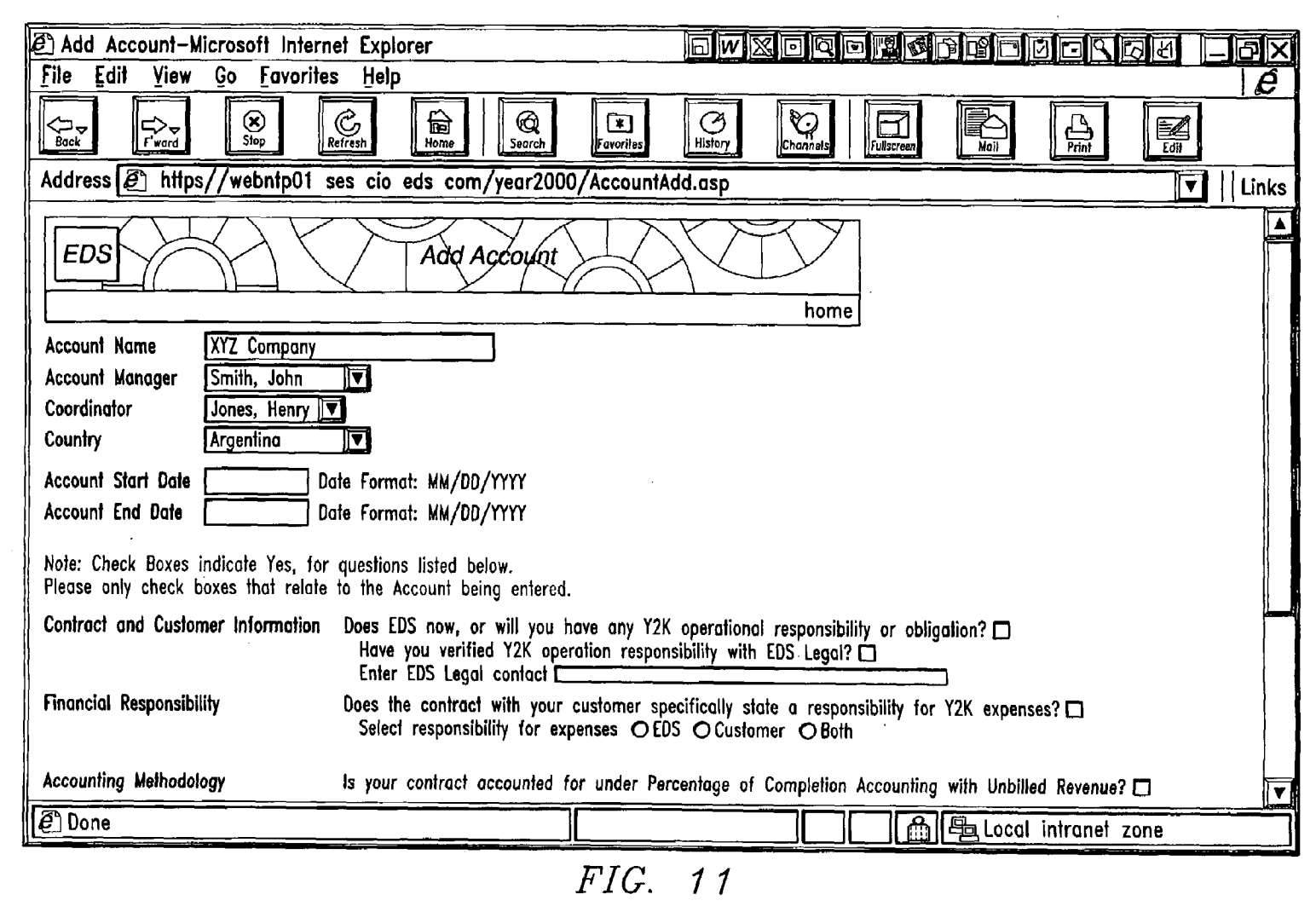

FIG. 11 is an exemplary screen of a web page to add an account according to the present invention. Data fields are provided for the user to provide the account name, identify the account manager and coordinator, and the country. The pull-down list for each data field only contains those data items related to the business unit identified by the role and person identifier of the user. For example, the account manager pull-down list only contains names of those persons having an account manager role in the business units for which the user is authorized to act (as defined by his/her role and update authority). Examples of those roles that may be authorized with update authority to add accounts are program manager, process coach, surrogates, and coordinator. Further, the start date and end date fields for the account are provided. Other information associated with the account may also be requested. A similar web page may be provided to revise data associated with an existing account.

FIG. 12 is an exemplary screen of a web page to update account forecast. This screen may be automatically displayed after the account is added. Using this page, a gross forecast amount for each category may be entered at the top, which is then automatically distributed evenly throughout the months between the start and end dates entered previously for the account. Alternatively, forecast amounts by month for the account may be entered. Because the program shown in the screen shot is a year 2000 remediation program, the forecasts amounts are associated with Y2K and non-Y2K revenues and expenses.

If an actual start date was identified, a web page for the entry of monthly actual amounts is automatically displayed, an example of which is shown in FIG. 13. The user may then enter the monthly actual revenue and expense amounts.

Account forecast data may be revised or updated by program managers, process coaches, surrogates, and coordinators. Account actual amounts may also be updated on a periodic basis to report account-level financial information. An exemplary screen for account actual update is shown in FIG. 14. Periodic account actual updates capture useful information for reporting to the senior executives and board of directors of the organization. Because account actual information is typically available at a lower level in the chain of command, account actual updates may be entered by project managers and account managers, as well as program managers, process coaches, surrogates, and coordinators. In the embodiment shown, monthly updates are required.

In order to more easily determine that monthly updates of account actuals are entered, the concept of a worklist is used. A worklist is a list of all the data that still remain to be updated at a given time. At the beginning of each reporting or update period, the worklist contains the entire list of data that are required for a project for that period as well as for any previous period, if they were not updated previously. As data are entered by each account manager, that data entry is removed from the worklist. Therefore, a project manager or any one having a management role is able to, at one glance, determine which data still need to be updated each month or each period. In the update account actuals screen shown in FIG. 14, a 0$ column may be checked if no data is to be reported for that month, so that the worklist may be modified with the month's actual removed. In other screens, the option of checking off a no change (N/C) box also functions to remove that particular data from the worklist. In this manner, affirmative action is required to remove a data from the worklist, either by providing update data or by indicating that no change or progress has been made in that time period.

Figure 15A:
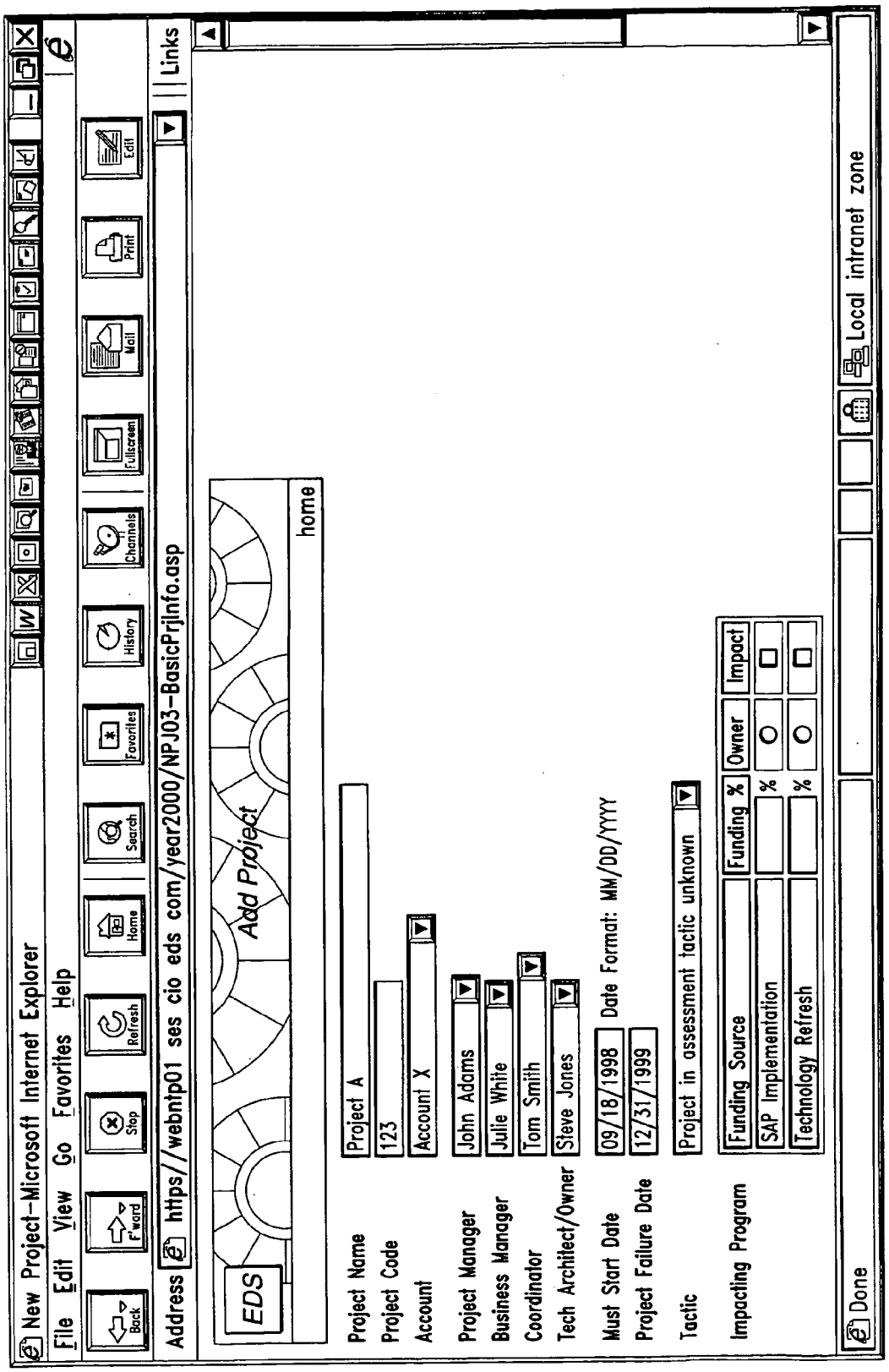
Figure 15B:
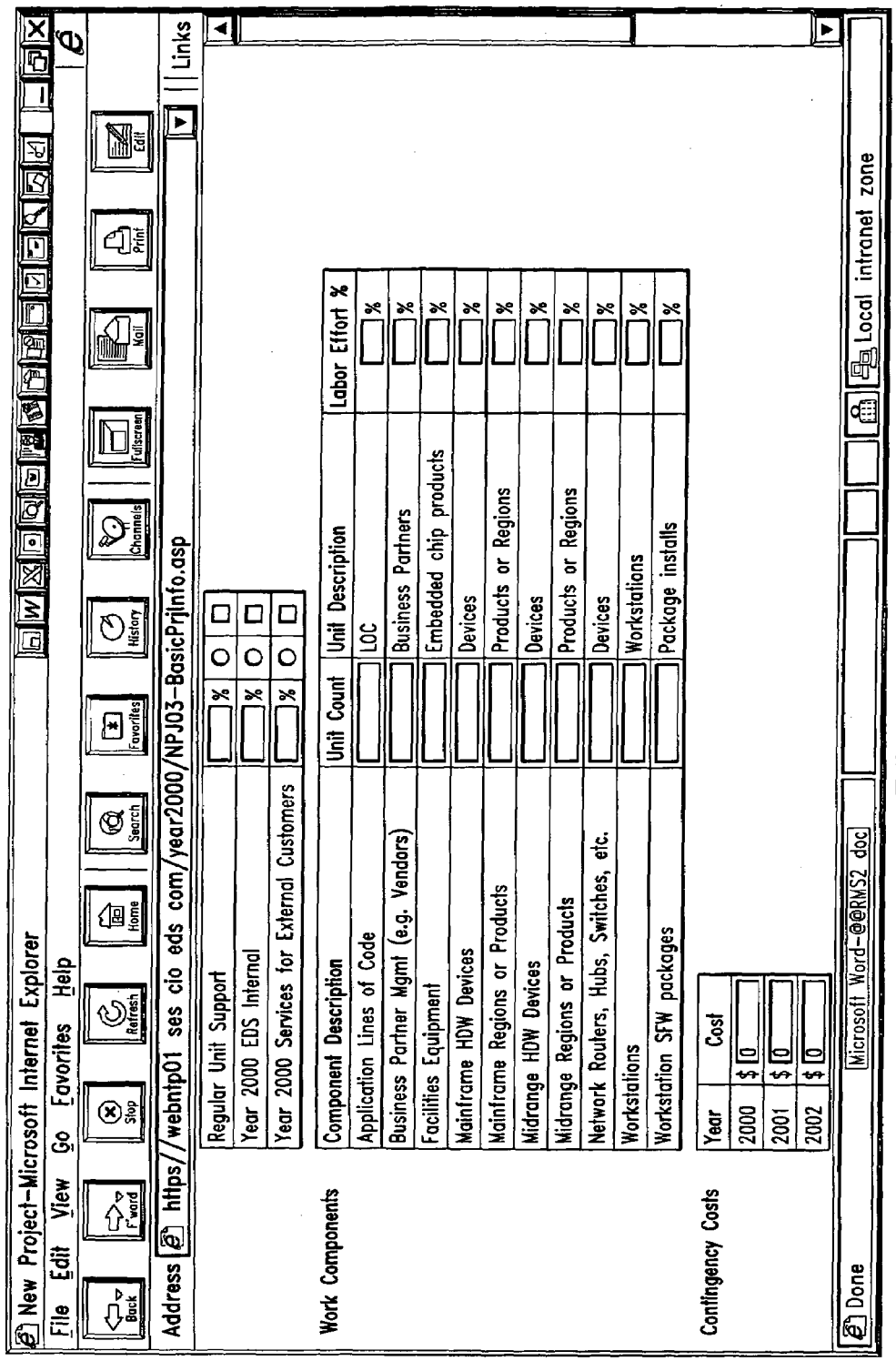
Figure 17:
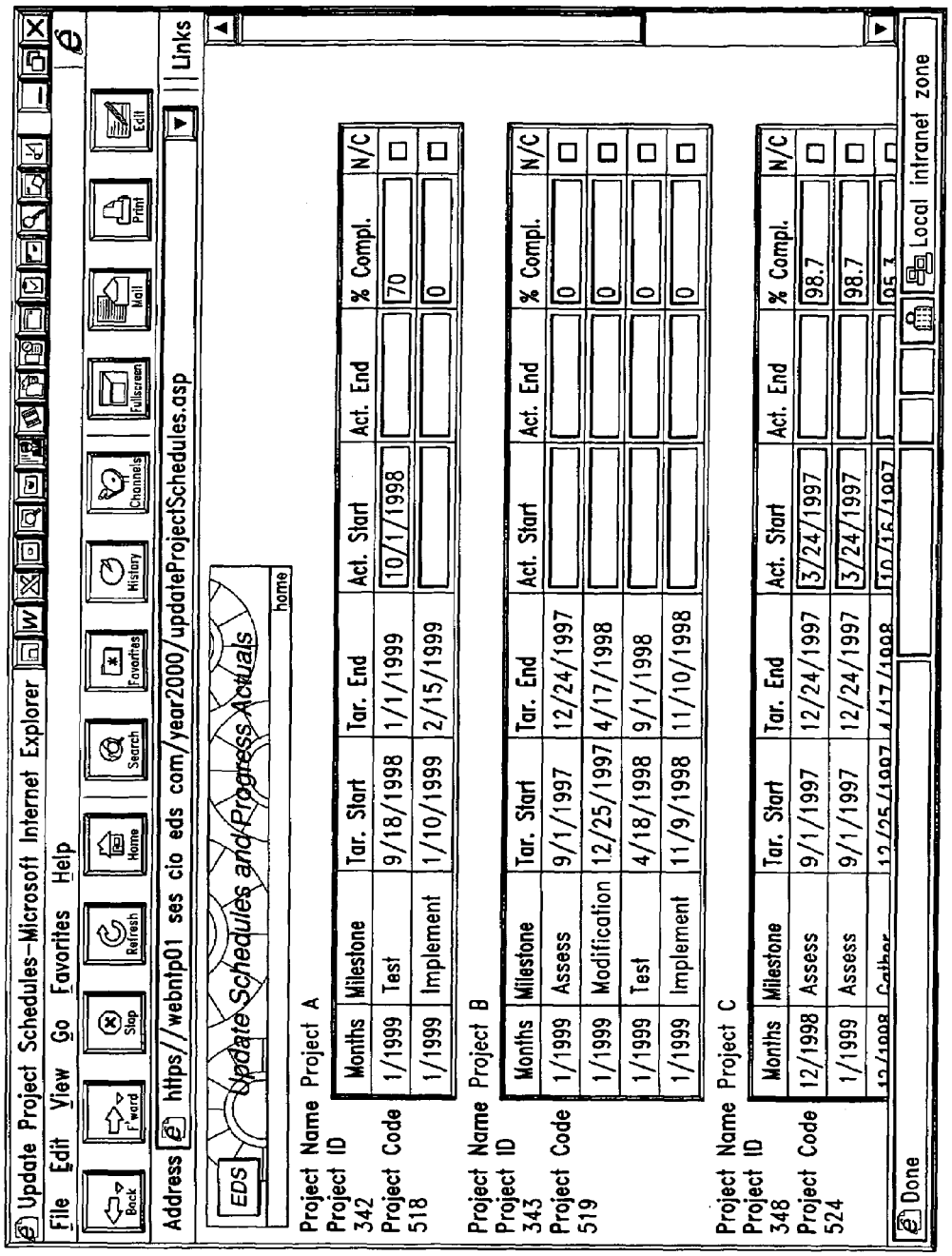
FIG. 17 is an exemplary view of an update schedules and progress actuals screen of the web user interface.

FIGS. 15–17 provide exemplary screens for adding, revising, and updating project information. FIGS. 15A and 15B are an exemplary screen for adding a new project to an account. Only persons with certain assigned roles such as program manager, process coach, surrogate, and coordinator may have authorization to add projects. After selecting the business unit from a drop-down list, the screen shown in FIGS. 15A and 15B appears for the user to enter data associated with the project to be added. The project name, project code are entered. The project manager field, business manager field, coordinator field, and technical architect/owner field each has a drop-down list of possible names of persons who may fulfill these roles for this project. In this manner, data entry is very controlled and therefore errors are largely minimized or eliminated. Project must start date and project failure dates are then entered in the appropriate fields. From the tactic drop-down list, the appropriate tactic is selected. From the selected tactic, milestones are determined.

In the next section, Impacting Program, those programs that fund the project wholly or partially are selected. If the project is fully funded by one program, 100% is entered by the appropriate program, otherwise, those programs that share the project are selected with the appropriate percentage funding entered. Further, the program that own the project is selected, and those programs that may impact the progress of the project are also selected.

In the next section, the number of units for the primary work components of the project and how much labor percentage is allocated to each component are entered. Work components may be lines of code, hardware equipment or devices, network components, etc.

In the next section, the estimated annualized contingency costs that will be incurred if the project fails or is not approved is entered. Once information on this screen is fully entered, selecting the next button prompts the second add project screen to be displayed, as shown in FIG. 15C. From the drop-down lists, select the appropriate functional area, country, and weight impact information. The next screen is shown in FIG. 15D, which prompts for project milestone data. The milestones are determined by the previously selected tactic. The milestones may be user-defined so that users can add tactics to identify their own set of milestones. Alternatively, the end user may utilize industry standard tactics and milestones. Target start date, actual start date, target end date, actual end date, and percent completed data are entered for each milestone.

In FIG. 15E, an exemplary screen for entering project forecast data is shown. The monthly forecast amounts may be entered or a gross amount may be entered at the top, which will be distributed evenly throughout the months. The forecast amounts are entered for hardware costs, software costs, labor costs, and full time equivalents (FTEs).

If an actual start date were entered on the milestone screen in FIG. 15D, then a project actual screen appears. An exemplary project actual screen is shown in FIG. 15F. The project actual amounts may be entered in the appropriate columns.

The project data and forecasts may be revised. The basic information associated with the project, such as people assigned, may be revised as well as re-baseline project dates and costs. For example, target and actual start and end dates for the milestones may be revised or updated; the hardware, software and labor cost forecasts may be revised or updated; and the hardware, software and labor cost budgets may be revised or updated. Old baseline information are archived as project history in program office database 12. The manner in which project history is stored is described below. Further, the impacting program, work component, contingency cost, and weight information of the project may also be revised or updated via appropriate screens (not shown).

As described above, web user interface 15 may be used to periodically update the actual amounts or values for budget, labor, schedules, and progress. Budget and labor actuals may be periodically updated by a program manager, process coach, surrogate, or an account manager. FIG. 16 shows an exemplary screen for entering budget and labor actuals. If the project did not consume cost or FTEs for the period, checking the 0$ box removes that item from the worklist for the period.

Project schedules and progress actuals may also be updated periodically. An exemplary screen for updating schedules and progress actuals is shown in FIG. 17. This screen contains an entry for each project in the account or program that has an incomplete milestone. Only program managers, process coaches, surrogates, and coordinators may have access to this screen. The percent completed field may be updated to show progress toward a milestone that has not reached the end date. This percent completed data is determined independent of the forecasts or actuals in terms of labor resources or dollar amounts. The N/C boxes may be checked to indicate that the data for the milestone is unchanged for the reporting period or no progress has been made during the reporting period. This action removes the item from the worklist so that the program office is able to distinguish projects that are not being updated from those that are stalled or in trouble.

Figure 18:
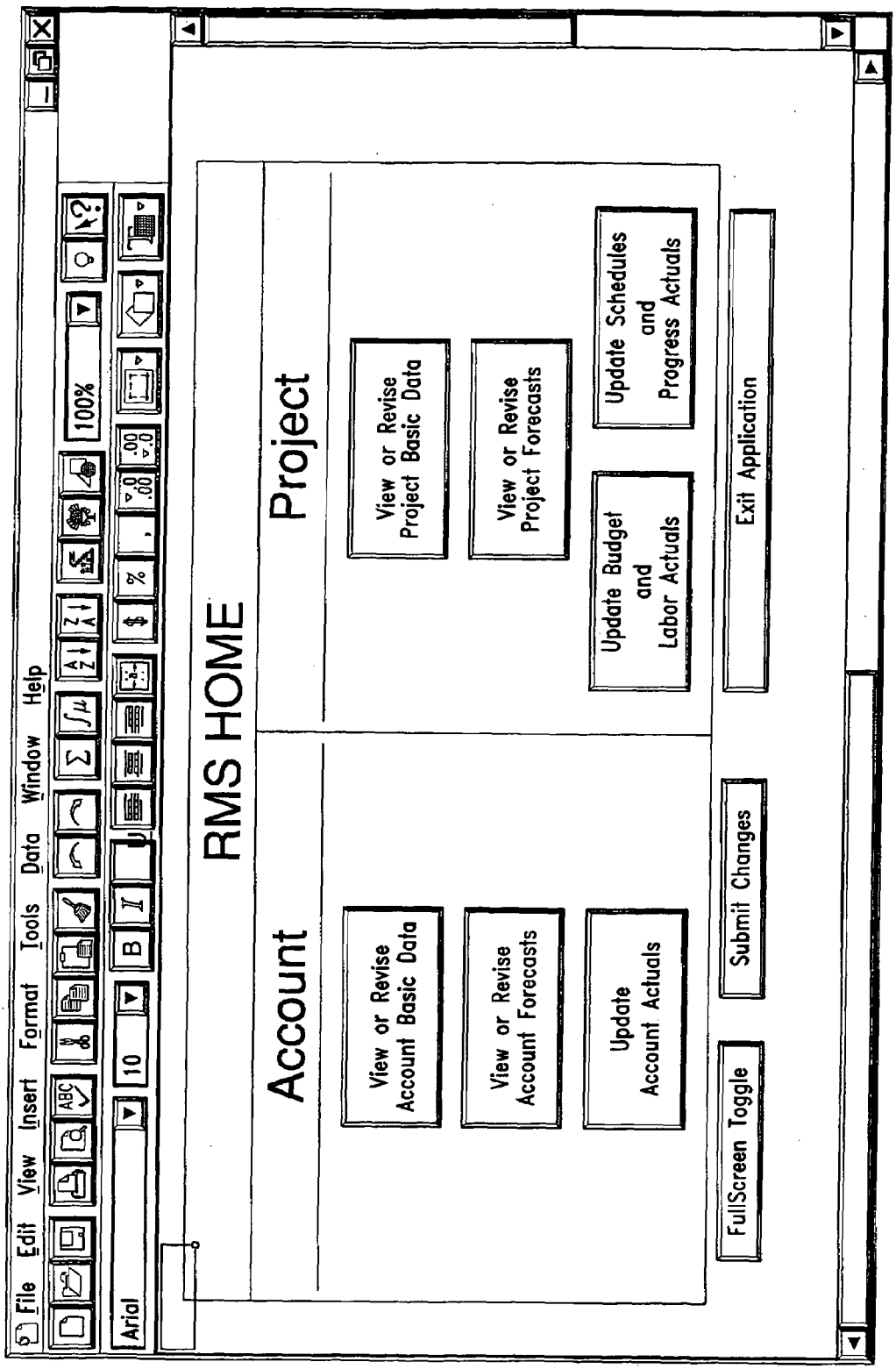
FIG. 18 is an exemplary view of a home screen of the self-extracting user interface.
Figure 19:
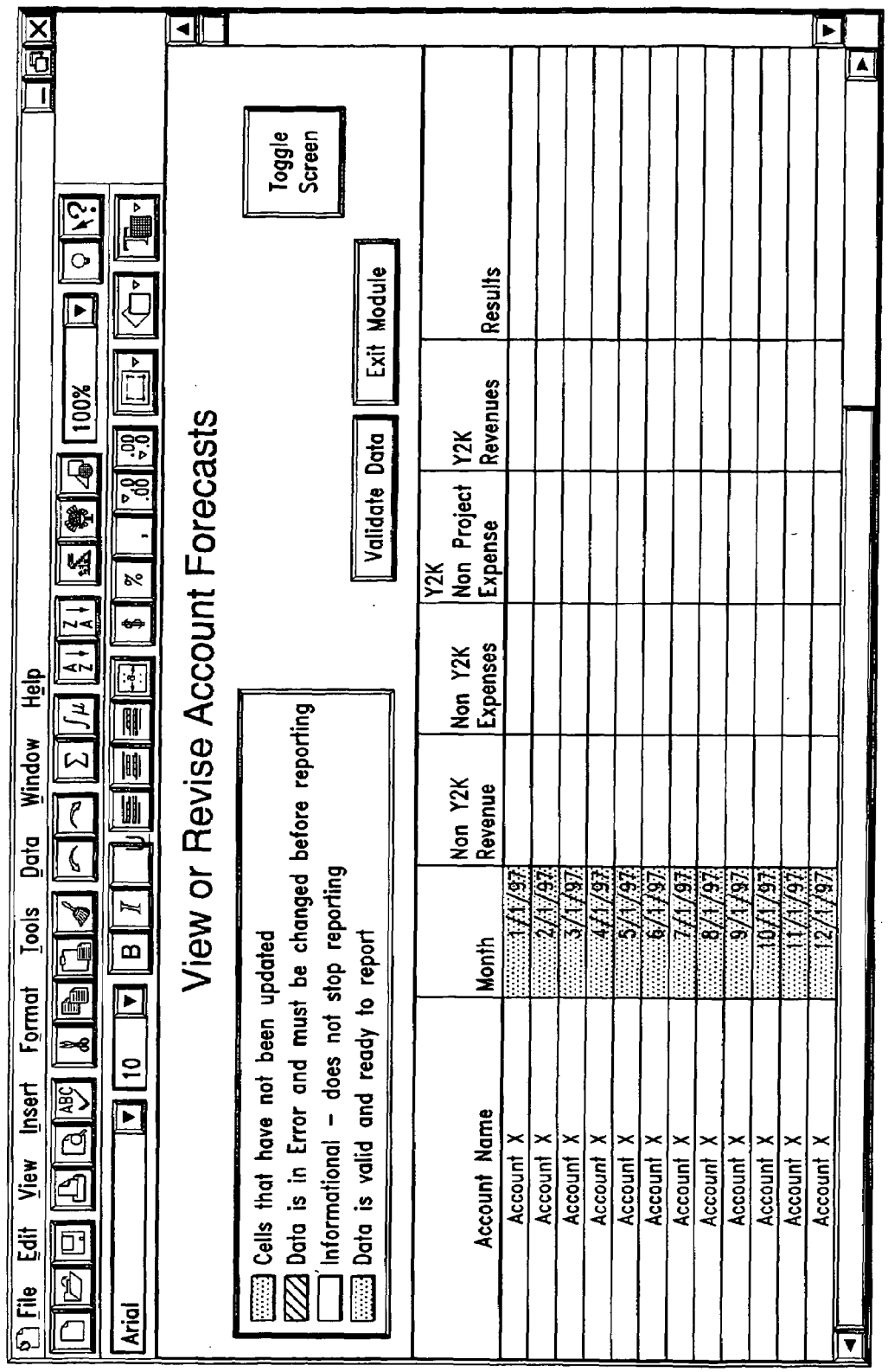
FIG. 19 is an exemplary view of a view or revise account forecasts screen of the self-extracting user interface.
Figure 20:
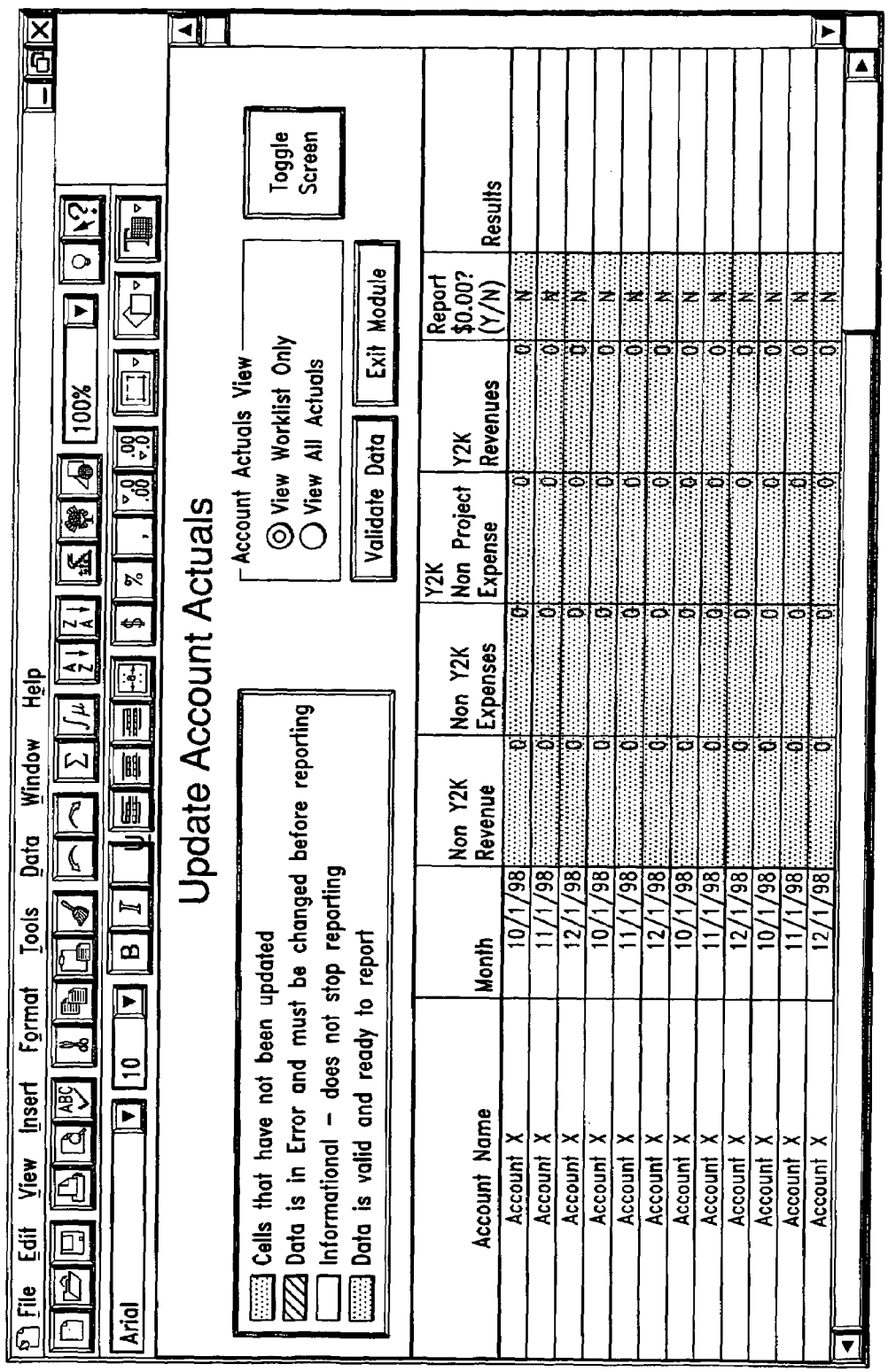
FIG. 20 is an exemplary view of an update account actuals screen of the self-extracting user interface.

FIGS. 18–20 are exemplary screens of self-extracting user interface 16 to allow users to report periodic update data. Self-extracting user interface 16 is primarily intended to be used by account managers to report account-level data to upper management.

FIG. 18 is the first screen that is displayed when self-extracting user interface 16 is executed. As shown, several account and project functions are available, such as view or review account and project basic data, view or review account and project forecasts, update account actuals, update budget and labor actuals, update schedule and progress actuals. These functions are displayed on buttons which may be clicked on to initiate the respective function. These functions are similar or the same as those described above to provide updates or revisions to account and project data. However, because self-extracting user interface 16 is not browser-based, the screens and the manner in which the data are entered may be different. For example, if self-extracting user interface 16 is based on a spread sheet program such as Microsoft Excel, then the data fields are likely to be displayed and entered in a spread sheet format.

FIG. 19 is an exemplary screen or view to revise account forecast data using self-extracting user interface 16. Note that the cells may be coded or colored according to the status of the data contained therein. In this manner, cells that have not been updated, cells containing erroneous data, and cells containing valid data are flagged to the user to take appropriate action, if needed. For example, in the results column, cells that still need update data may be coded blue, cells that contain data that seem suspicious or questionable may be coded yellow (as compared with some predetermined criteria or range), cells that contain erroneous data may be coded red, and cells that contain data that is neither suspicious or erroneous may be coded green. Therefore at one glance, the user is able to direct his or her attention to those data items that require additional verification or input.

FIG. 20 is an exemplary screen to update account actuals using self-extracting user interface 16. This screen displays an additional feature, the ability to toggle between the worklist and the entire list. As described above, the worklist is a list of those data items that require periodic update. As data items are entered or updated, they are removed from the worklist, so that only those data items still requiring input at any one point are displayed. At the end of the reporting period when a coordinator or program manager views the worklist, it should be empty, indicating that all data requiring update have been updated in a timely manner. The screens for updating account actuals, budget and labor actuals, and schedule and progress actuals preferably have this toggle option to either view only the data items in the worklist or all data, with the ability to quickly toggle between these two views.

Figure 21A:
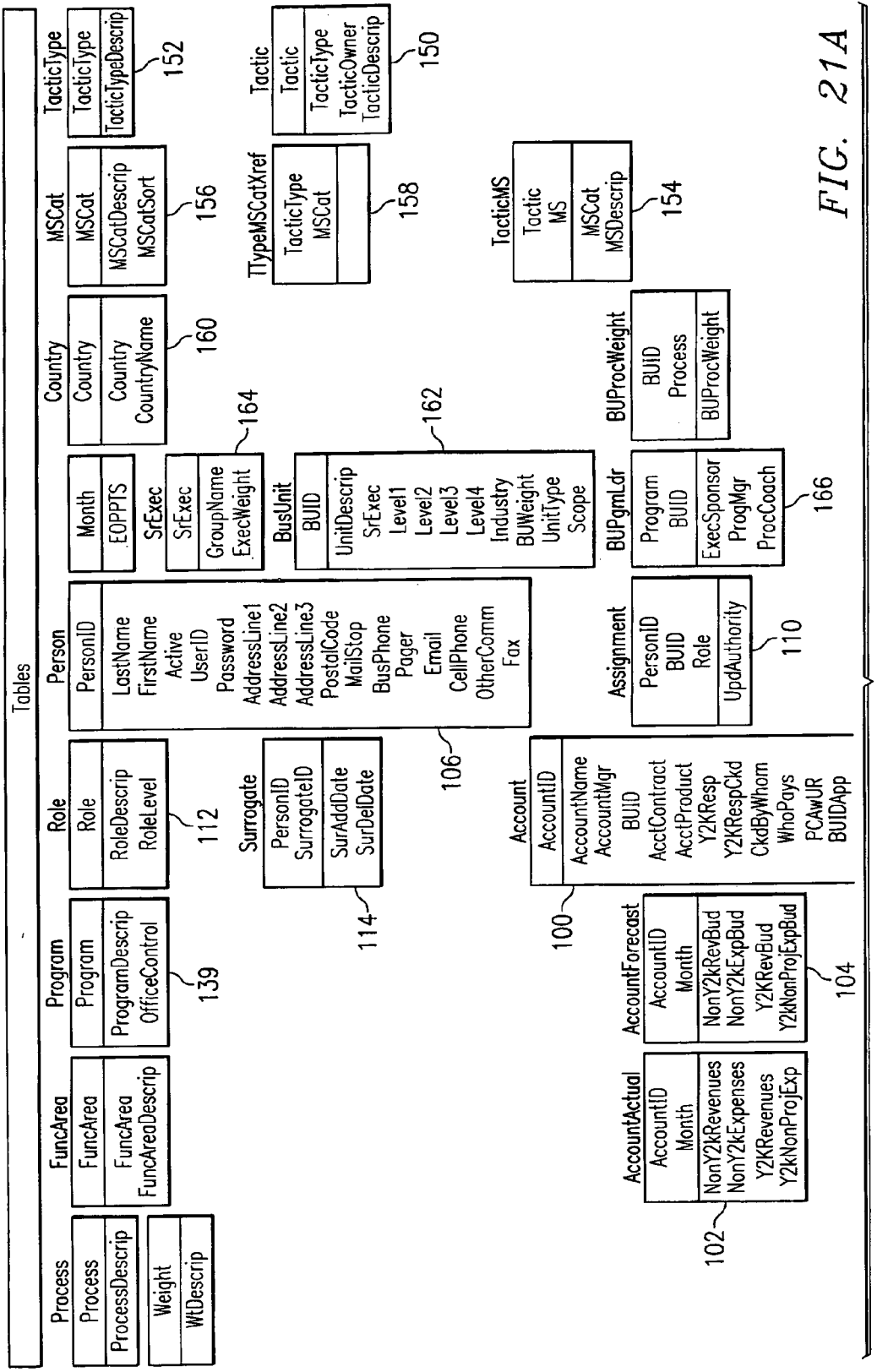
FIG. 21 is a data model of an embodiment of the program office database.
Figure 21B:
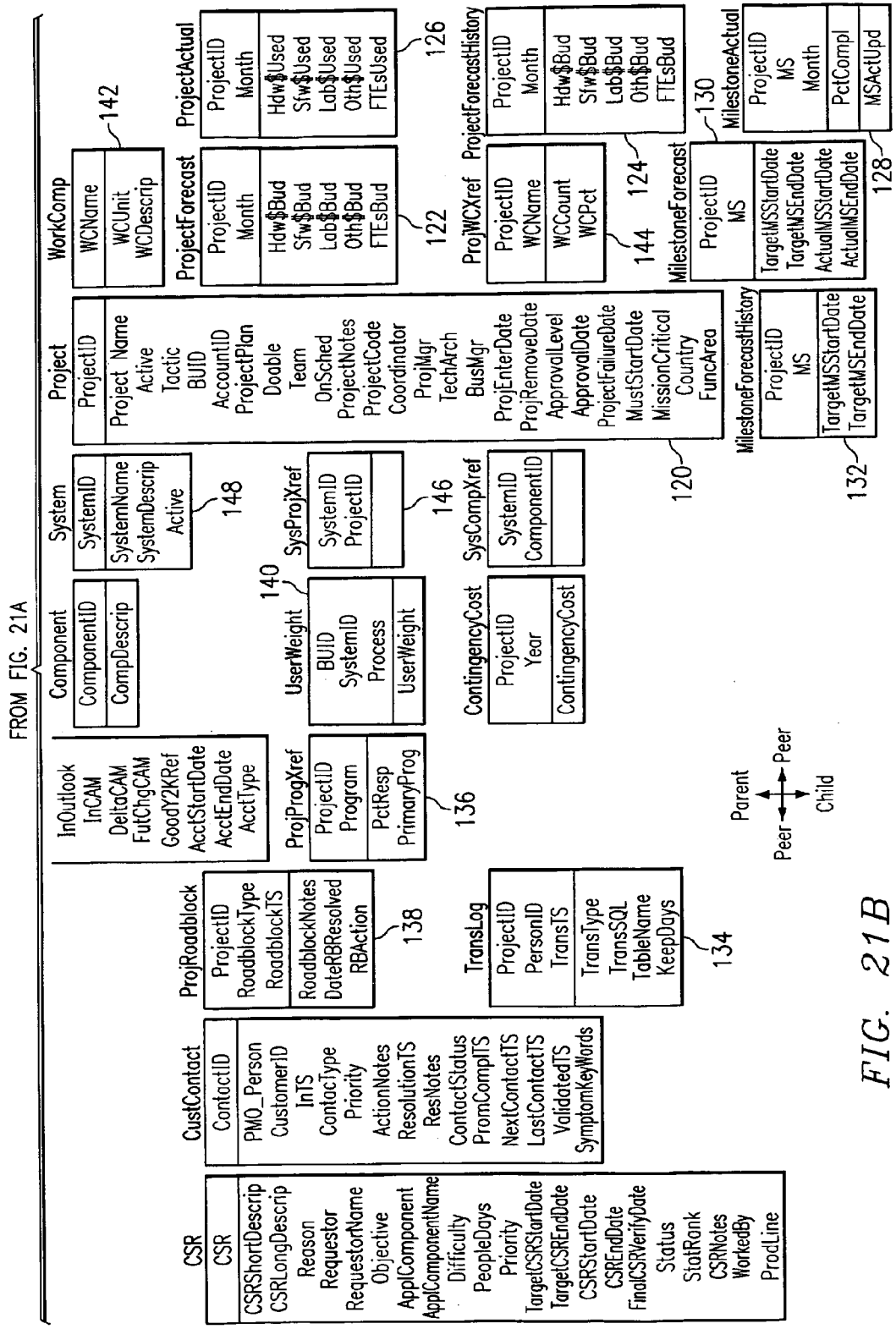
Figure 22A:
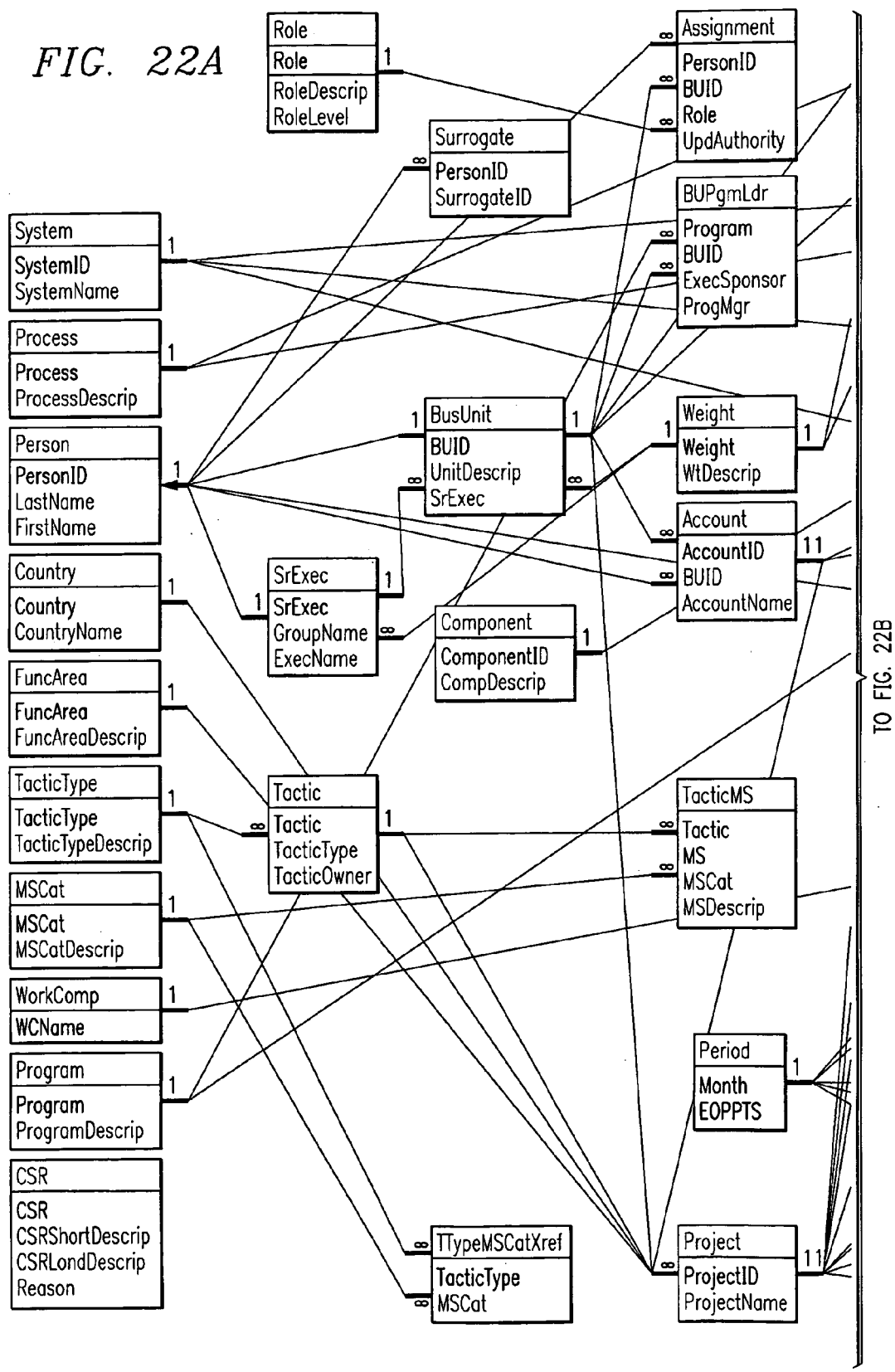
FIG. 22 is a relational data model of an embodiment of the program office database.
Figure 22B:
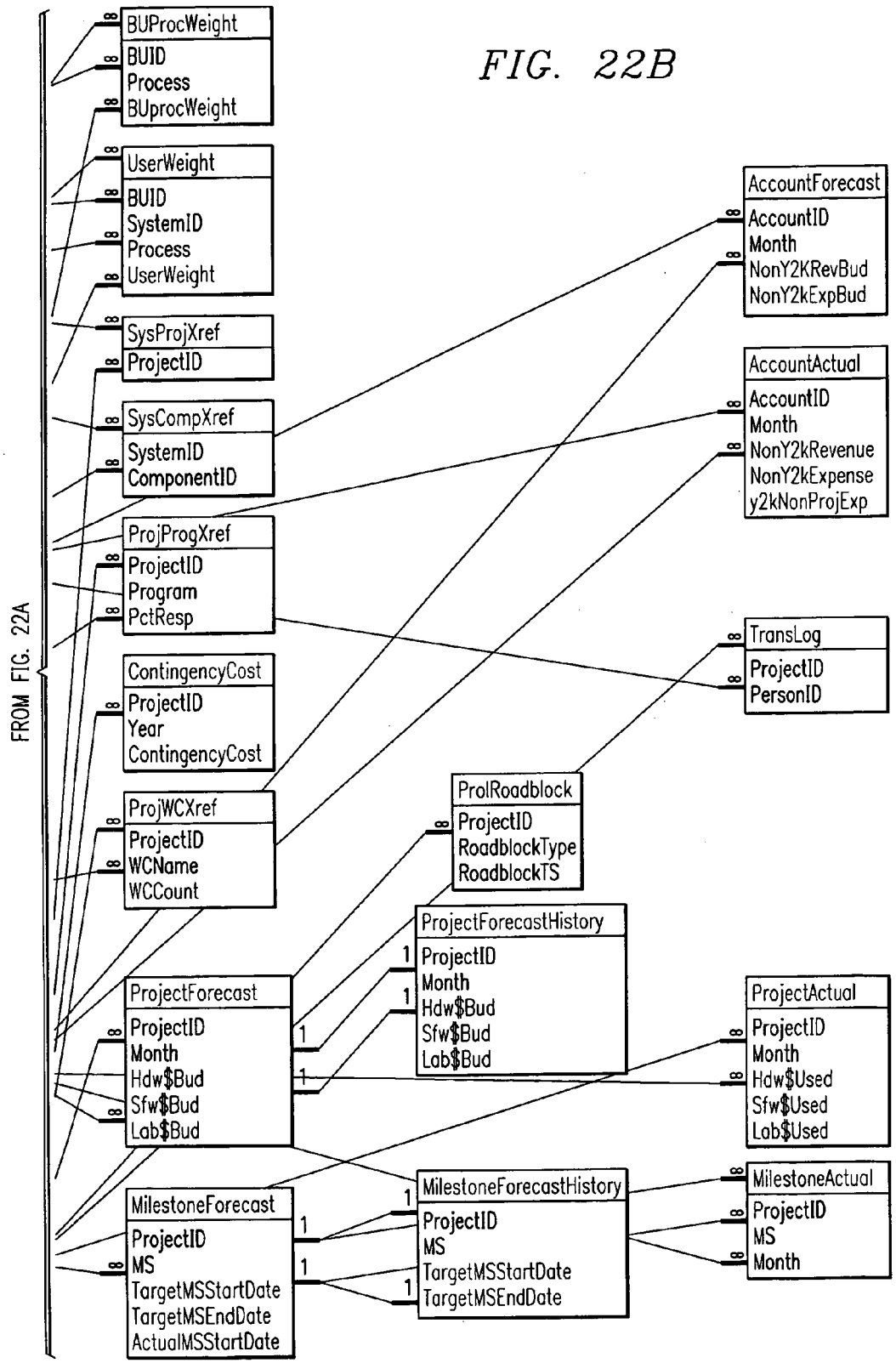
Figure 23:
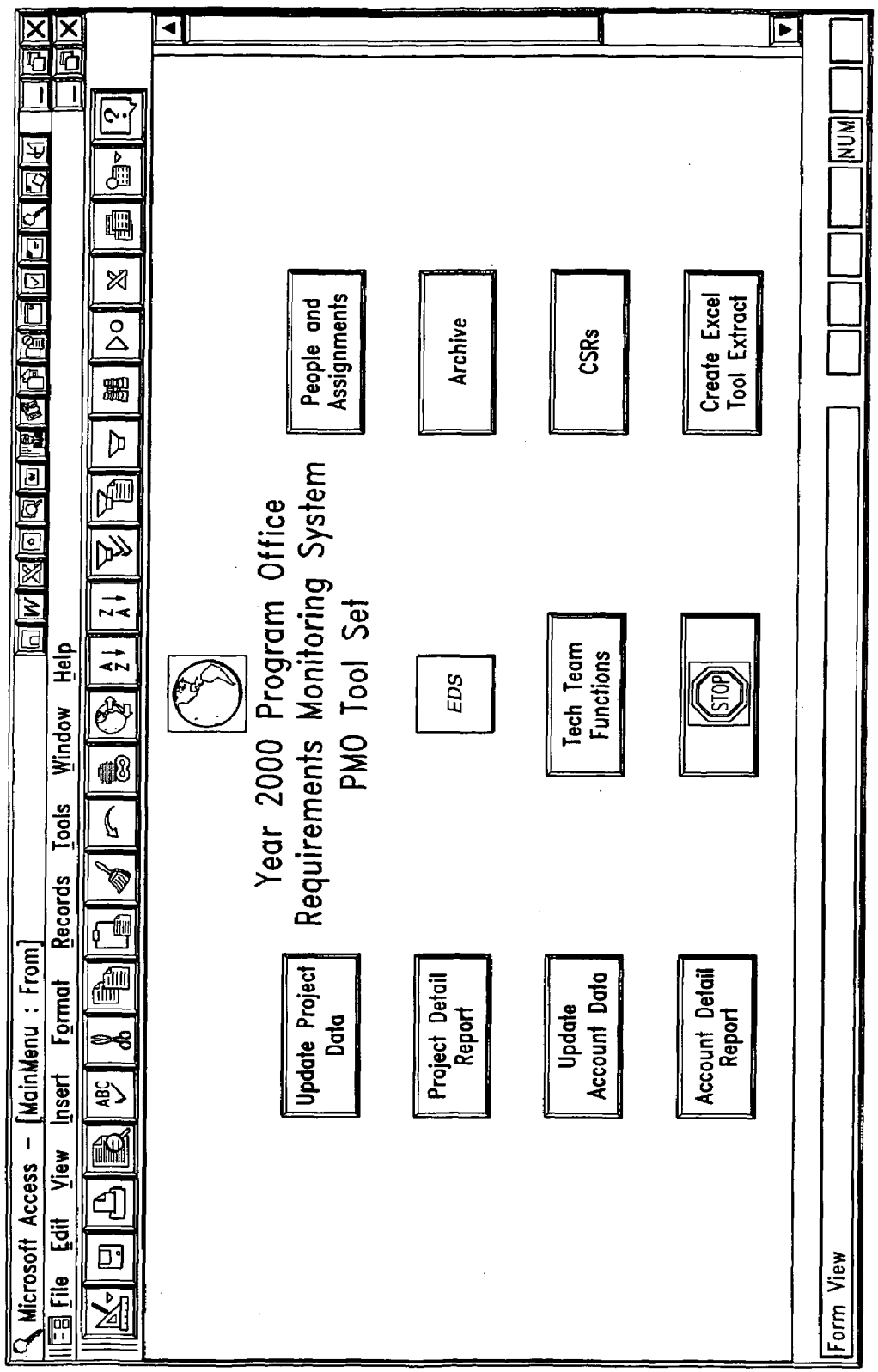
FIG. 23 is an exemplary view of a home screen of the program office interface.

Referring to FIGS. 21 and 22, two views of an exemplary relational data model of the data structure used in the system and method of managing a program office of the present invention are shown. Each data table and selected data fields contained therein are described below as well as the relationships between the data tables and data fields.

The account table 100 stores attributes unique to an account and current values of dependent parameters. The account identifier is the primary key of the table, which uniquely identifies the account. The account table further contains a business unit identifier (BUID), which may be the personal identifier of the executive who has oversight responsibility over the business unit. The account name, name of the account manager are also provided in the account table.

The account table 100 is linked to the account actual table 102 and the account forecast table 104 by the account identifier. The account table 100, account actual table 102 and the account forecast table 104 are used in this embodiment to track those accounts in which the expenses are offset by the revenues. The account actual table stores the actual amounts of the account by the reporting period, such as monthly reporting. Revenue and expense actual amounts are stored in the account actual table 102. In the embodiment shown, revenues and expenses associated with the Y2K account are stored, but such data fields may be generalized or customized for other types of projects. The account actual table 102 may include non-Y2K revenues, non-Y2K expenses, Y2K revenues, and Y2K non-project expenses.

Similarly, the account forecast table 104 stores revenue and expense budgets for the account for each reporting period. The account forecast table 104 may include non-Y2K revenue budget, non-Y2K expense budget, Y2K revenue budget, and Y2K non-project expense budget.

A person table 106 stores the attributes related to each person referenced with a role in program office database 12. The person identifier is the primary key in this table. Attributes in the person table may include the person's name, user identifier, password, and all relevant contact information.

The person table 106 is linked to an assignment table 110, a role table 112, and a surrogate table 114 by the person identifier. The assignment table 110 lists persons who are allowed to fill certain roles for specific business units. The assignment table 110 also contains the business unit identifier which identifies the business unit that the assignments are valid for. The role data field contains the assigned roles for the business unit. The update authority data field contains person identifiers of those persons having the authority to update or change the data associated with data of that business unit.

In the role table 112, the role data field is a primary key. Description of each role is defined (RoleDescrip) and the hierarchical authorization level of each role (RoleLevel) are defined. In the surrogate table 114, the person identifier again is the primary key along with a surrogate identifier. The surrogate identifier is the person identifier of the person assigned as the surrogate for the senior executive for the business unit. Additionally, a surrogate add date for the date the surrogate status was assigned to the person and a surrogate delete date field for the date the surrogate status was taken away are stored in the surrogate table.

Data tables related to projects include a project table 120, which stores attributes unique to a project and current values of dependent parameters of the project. Project attributes include those that are required, those that are used for audit purposes, those that are program objective specific, and those that are optional. Required attributes include a project identifier (ProjectID) which uniquely identifies each project. Project Name stores the name of the project. Active indicates the current status of the project. The Tactic field identifies the tactic defined for the project. The business unit to which the project belongs to are also identified with the business identifier (BUID). Audit attributes may include data items such as Project Plan, which provides the plan for the project; Doable, which indicates whether the project can be completed with the project plan; Team, which identifies the team personnel; On Schedule, which indicates whether the project is on schedule with respect to the milestones; and approval level, which indicates whether the project is approved and pending or inactive, and further how to account for the dollars spent in a project that is now inactive. The audit attributes can only be updated or changed via program office interface 13 by auditors.

Other attributes are program objective specific which may change according to the needs of the program. Program objective specific attributes may include Mission Critical, which indicates whether the completion of the project is critical to the success of the corporation; Functional Area, which identifies areas covered by the project such as human resources, infrastructure, accounting, purchasing, customer services, etc.; and Country, which indicates the geographical location of the project. Other program objective specific attributes may include those that identify the coordinator, project manager, technical architect, and business manager that have oversight responsibility over the project (Coordinator, ProjMgr, TechArch, BusMgr). Previously described date values, the must start date of the project (MustStartDate) and failure date (ProjectFailureDate) of the project are also stored in project table 120. The remainder may be optional attributes. It is important to note that the attributes, aside from the required attributes, may be modified to tailor the type of project and what aspects of the project are crucial to monitor and report.

The project table 120 is linked by the project identifier to many other data tables, including the project forecast table 122, project forecast history table 124, project actual table 126, milestone actual table 128, milestone forecast table 130, milestone forecast history table 132, transaction log table (TransLog) 134, project and program cross-reference table 136, and project roadblock table 138. Because the project forecast table 122, the project actual table 126, and the project forecast history table 124 contain financial information, access to data stored in these tables is strictly guarded to allow only personnel with the appropriate role and authorization level to view the information.

The project forecast table 122 contains the current budget forecast amounts for the project. The project identifier and the month are primary keys for this table. The hardware, software, labor and other budget amounts entered and updated via web user interface 15 and self-extracting user interface 16 are stored here.

The project forecast history table 124 stores the original budget forecasts when the current forecasts stored in the project forecast table 122 are different from the original. Therefore, the project forecast history table 124 may be null when the original budget forecast amounts have not been changed. This archive scheme means that the project budget forecast amounts are only stored in the project forecast history table 124 only when a change has been made and not done on a periodic basis.

The project actual table 126 contains the actual project dependent values reported periodically. The project identifier and the month the expenses were incurred are the primary keys. The data fields include the actual expenses used on hardware, software, labor, etc.

The milestone forecast table 130 maintains the current forecasted milestone dates. If no changes have been made to the original forecasts, then the current forecast is also the original forecast. The project identifier and the milestone are the primary keys to the table. The target milestone start date and end date, and the actual milestone start date and end date are stored in this table.

The milestone forecast history table 132 maintains the first or original forecast if changes have been made to the original forecast. Therefore, if no changes have been made to the original forecast, then this table would be empty. If the forecast has been changed more than one time, the milestone forecast history table 132 will still maintain the original forecast, and forecasts other than the original and the current forecasts are stored and archived in the TransLog table. The project identifier and the milestone are the primary keys to the table. The target milestone start and end dates are archived in this table.

In the milestone actual table 128, the project identifier, milestone, and the reporting period are the primary keys. This table maintains the actual percentage completed (PctCompl) or progress toward the milestone during the respective reporting period. In addition, a MSActUpd attribute is a flag that indicates whether project milestone actual dates or percent complete were updates, or whether the user indicates there is no change in progress for the period.

The transaction log table 134 stores pertinent data associated with changes to program office database 12, such as the project identifier of the project affected, person identifier of the person making the change, and date and time of the transaction (TransTS). These are the primary keys to the table. Data fields include the transaction type, the transaction SQL (TransSQL), the name of the table changed, and the number of days to maintain the transaction log entry (KeepDays). Recall that project forecast table 122 maintains the current forecast and the project forecast history table 124 maintains the original forecast. Anything changes made between the original forecast and the current forecast are recorded in the transaction log table 134. Similarly, other changes made to the data in the database are also recorded in the transaction log table 134, such as when a project status changed from active to pending, or when a milestone forecast was changed.

The ProjProgXref table 136 stores cross-reference information identifying which programs are financially responsible for or impacted by each project. The project identifier and program name are the primary keys to this table. The PctResp data field stores the percentage the program is financially responsible for each project or are impacted by each project. The PrimaryProg data field stores the primary program owner of the project.

The project roadblock table (ProjRoadblock) 138 maintains problems encountered in the project and what was done to resolve them. Therefore the information in ProjRoadblock can provide lessons learned from past history and the roadblock is reported or escalated up the management chain until it is resolved. The project identifier is a primary key. A roadblock type data field and a RoadblockTS field for noting the date and time that the roadblock was encountered are stored in this table. Notes on the roadblock, the date and time the roadblock was resolved, and the action that was required to resolve the roadblock (RBAction) are also maintained in the project roadblock table. Using the history stored in this table, the problems may be escalated to management increasingly up the organization chart as they still remain unresolved over time. In this manner, upper management is alerted of problems hindering the projects promptly so that upper level decisions can be made in a timely manner.

The program table 139 lists all the valid programs included in program office database 12. Program name is the primary key, and program description is one data field. The office control data field flag to indicate if the program is under the control of the program office, so that financial data should be collected.

Another data table, UserWeight 140, stores the business unit weighting data of systems required for the business units to deliver value to the company. As described above, value to the company may be measured empirically in terms of revenue, earnings and profit, but value can also be determined by user weights stored in this table. As described above, user weights may be entered via user interfaces 15 and 16 using a screen similar to that shown in FIG. 15C, for example. In this manner, projects may be prioritized based on empirical value or value judgments in terms of the systems the projects affect, and how important these systems are to the business units.

The work component table 142 lists the valid work component categories. The work component name (WCName) is used as the primary key. The data field, WCUnit, is the type of work component, such as lines of code, hardware device, network device, facilities, etc. The data field, WCDescrip, provides further description of the work component.

The work component table 142 is linked to the project table 120 or project identifier by the project work component cross-reference (ProjWCXref) table 144. The work component table 142 stores the amount and type of work covered in a project. This table uses the project identifier and work component name as primary keys to access the work component count (WCCount) and the work component percentage (WCPct). WCCount is the count of the work component, and WCPct is the labor effort percentage required for the respective project.

The project is linked to the system by the SysProjXref table 146, which uses the project identifier and the system identifier to link the tables associated with projects to the tables associated with systems. A system table 148 is accessed using the system identifier as the primary key and contains the system name, system description, and an indicator of whether the system is currently active.

The next set of data tables is primarily responsible for the project management methodology independence of the present invention. A tactic table 150 has tactic as the primary key. The tactic is entered or selected for the project as described above when the project is added to the database. The tactic is used as a primary key in the tactic table. Other data fields include tactic type, tactic owner, and tactic description. Tactic type provides categories of valid tactic types. Tactic owner is the identifier of the person who defined the tactic as well as the milestones within the tactic. As part of defining the tactic, the tactic owner also specifies the milestone categories for the milestones, and the tactic type for the tactic. Tactic description provides a description of the tactic.

The tactic type table 152 is linked to the tactic table 150 and lists the categories of valid tactic types used for referential integrity. The tactic type is the primary key. Tactic type description provides description of the tactic types.

The tactic milestone (TacticMS) table 154 is linked to the tactic table 150 and stores the cross-reference information between milestones and tactics. The tactic milestone table 154 shows which milestones are used for which tactics. The tactic and milestone fields are primary keys to this table. MSCat is a data field that stores the milestone categories. MSDescrip is a data field that stores the description of each milestone.

The MSCat table 156 is a table that stores milestone categories. The milestone category is the primary key. Milestone categories may include assess, renovate, test and implement. Data fields include the milestone category description (MSCatDescrip) and a milestone category sort control field (MSCatSort).

The TTypeMSCatXref table 158 stores the cross-reference information on which milestone categories are required for which tactic types. Tactic type and milestone category are primary keys in this table. Using this table, milestones defined in a pre-existing project defined or managed in another project management tool may be cross-referenced or mapped to the defined tactic types of the present program office management system and methodology. Accordingly, a project managed by a conventional project management methodology or tool with its own set of milestones may be translated to the tactic types of the present system. In this manner, the project may be continued to be managed with the previous methodology or tool but reporting of that project's progress may be made in terms of milestone categories or common terms as described in the present invention.

Some additional data tables round out the functionality of program office database 12. The country table 160 provides a specification of the geographical location of the project. The business unit table 162 maintains attributes for reach business unit defined in the system and is accessed by the business unit identifier. The senior executive table 164 lists the senior executives in the company who are also assigned priority by an executive weighting scheme. The business unit program leader table (BUPgmLdr) 166 lists the program leaders for each business unit, such as the executive sponsor, program manager, and process coach.

Using these relational data tables in program office database 12, logical views or reports may be generated easily to provide information to upper management so that intelligent strategic decisions may be made with respect to all projects and programs undertaken by the corporation and across multiple geographical boundaries.

FIGS. 23–30 are exemplary screens of program office interface 13 for managing a Year 2000 program office. A number of functions are provided, including update project data, project detail report, update account data, account detail report, tech team functions, people and assignments, archive, CSRs, and create Excel tool extract.

Figure 24:
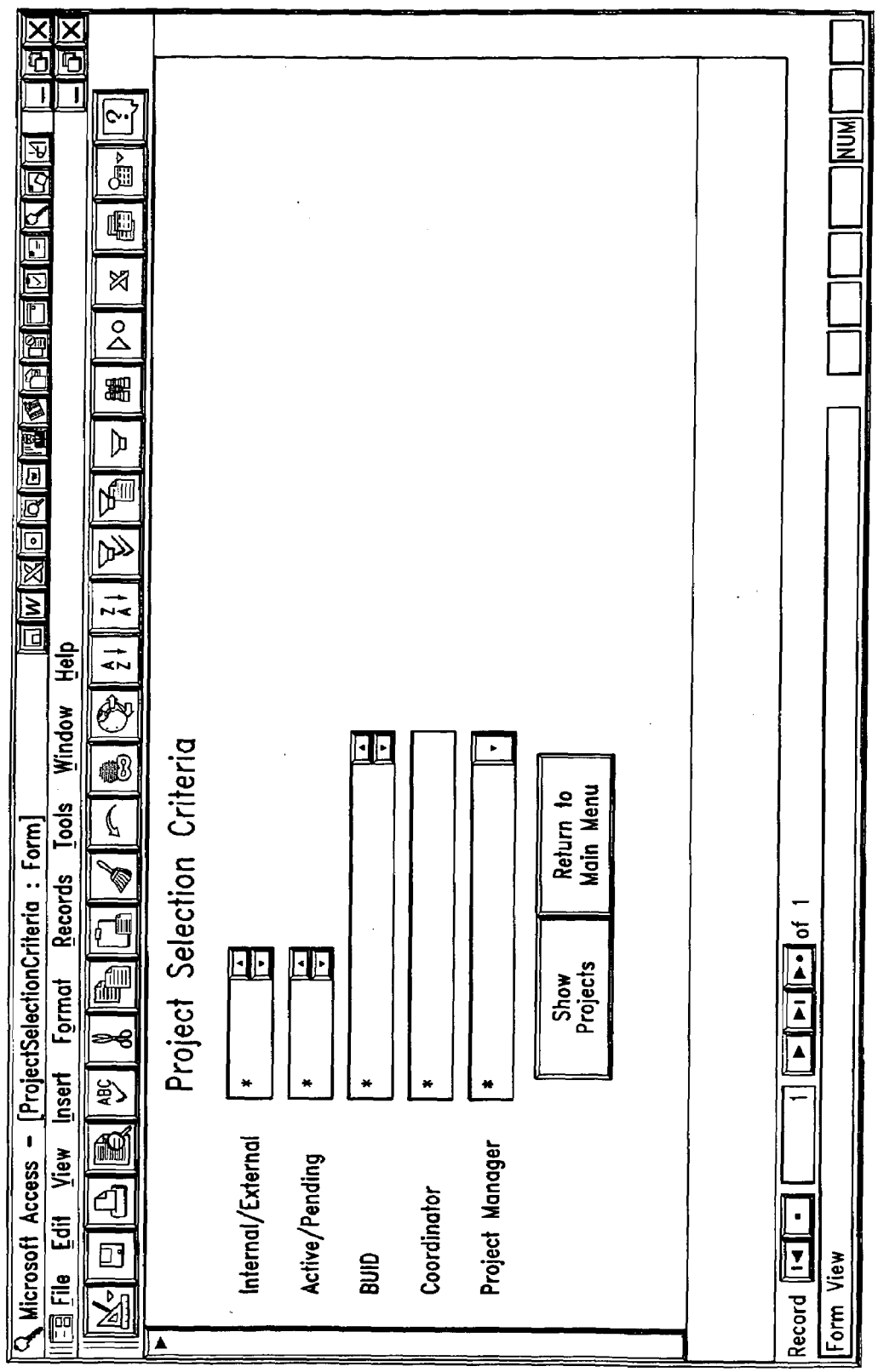
FIG. 24 is an exemplary view of a form screen for project selection criteria via the program office interface.

FIG. 24 is an exemplary screen to select a project. When one or more of the criteria are selected by the pull down lists, those projects satisfying the selected criteria are shown by clicking on the Show Projects button.

Figure 25:
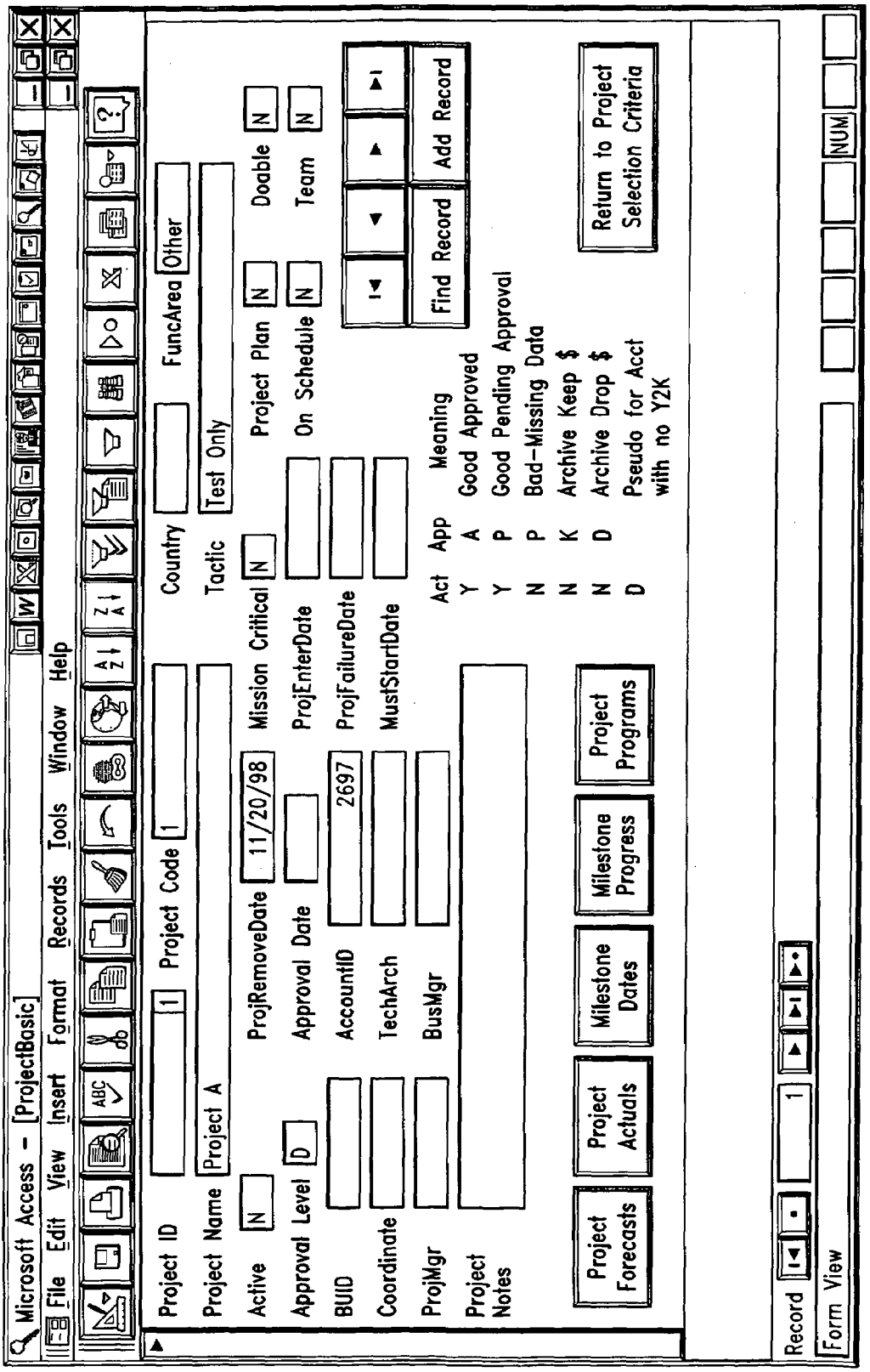
FIG. 25 is an exemplary view of a form screen for entering project data via the program office interface.

FIG. 25 is an exemplary screen to display some basic information as well as audit data about a project, including the project identifier, country, functional area, project name, tactic, active status, approval level, project plan, doable, on schedule, project remove date, mission critical flag, business unit identifier, account identifier, and identity of the coordinator, technical architect, project manager, and business manager, etc. A series of buttons may be clicked on to display additional update information, such as the project forecasts, project actuals, milestone dates, milestone progress, and project programs.

Figure 27:
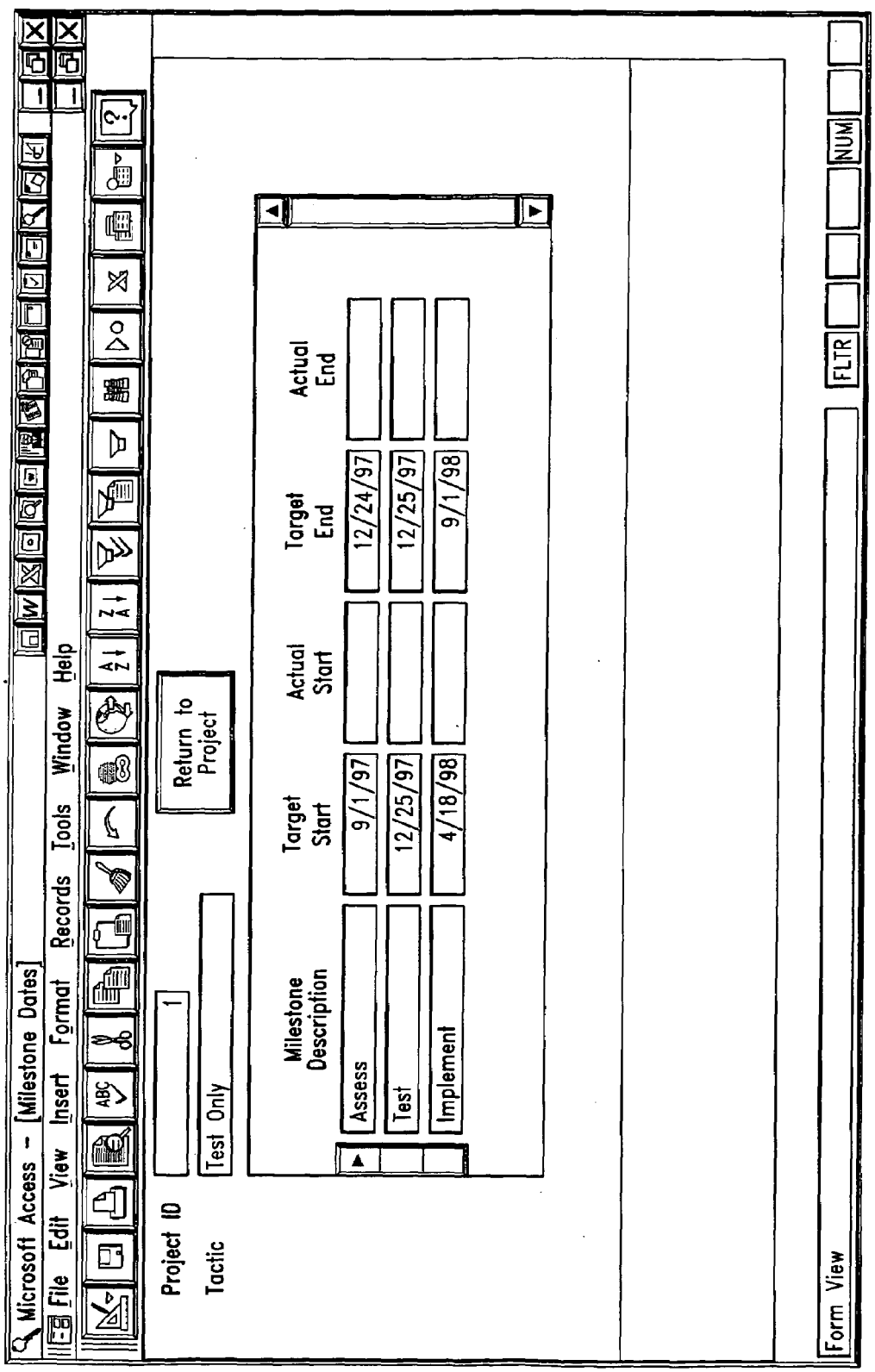
FIG. 27 is an exemplary view of a screen for viewing project milestone dates via the program office interface.
Figure 28:
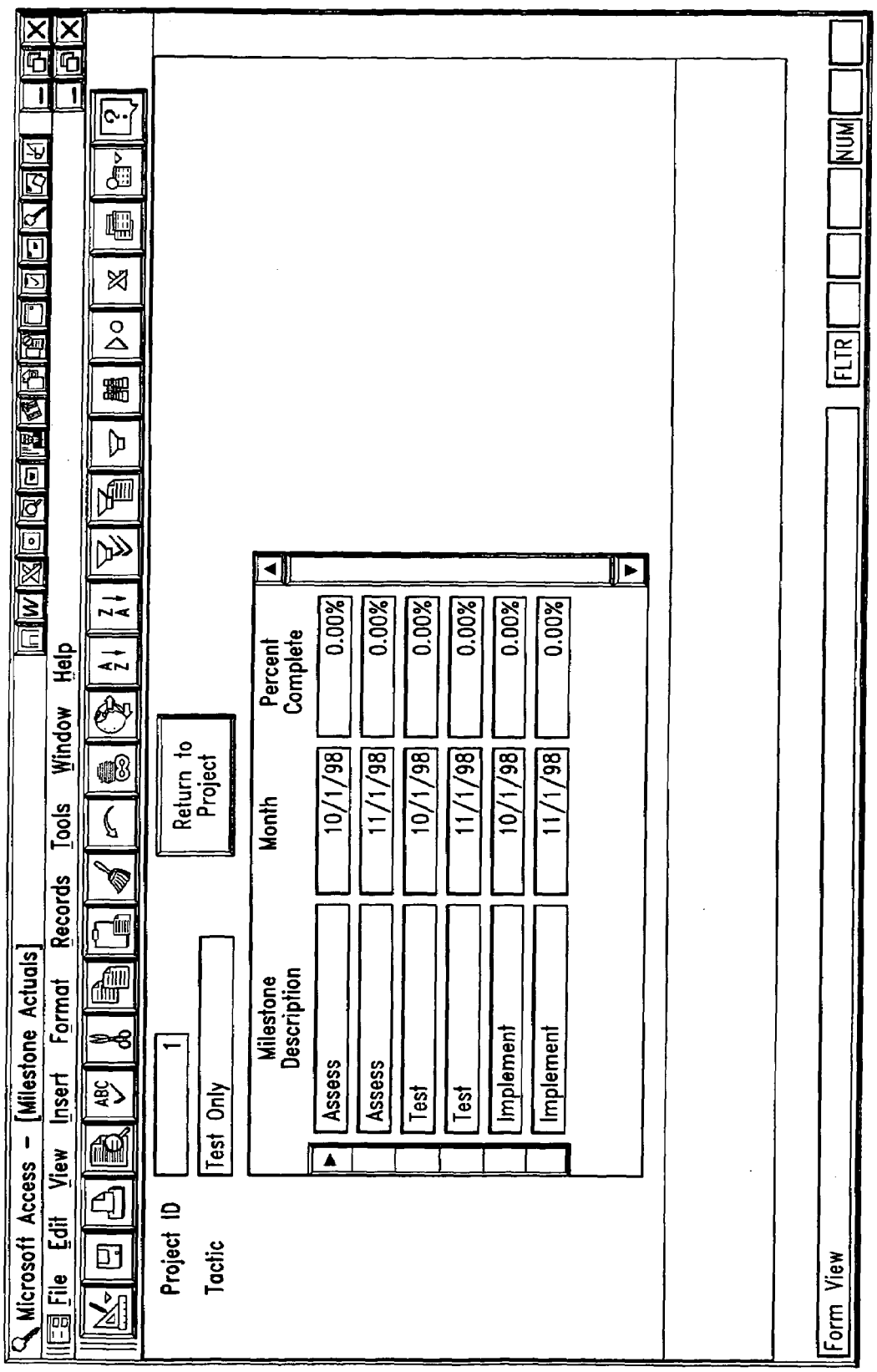
FIG. 28 is an exemplary view of a screen for viewing project milestone actuals via the program office interface.
Figure 29:
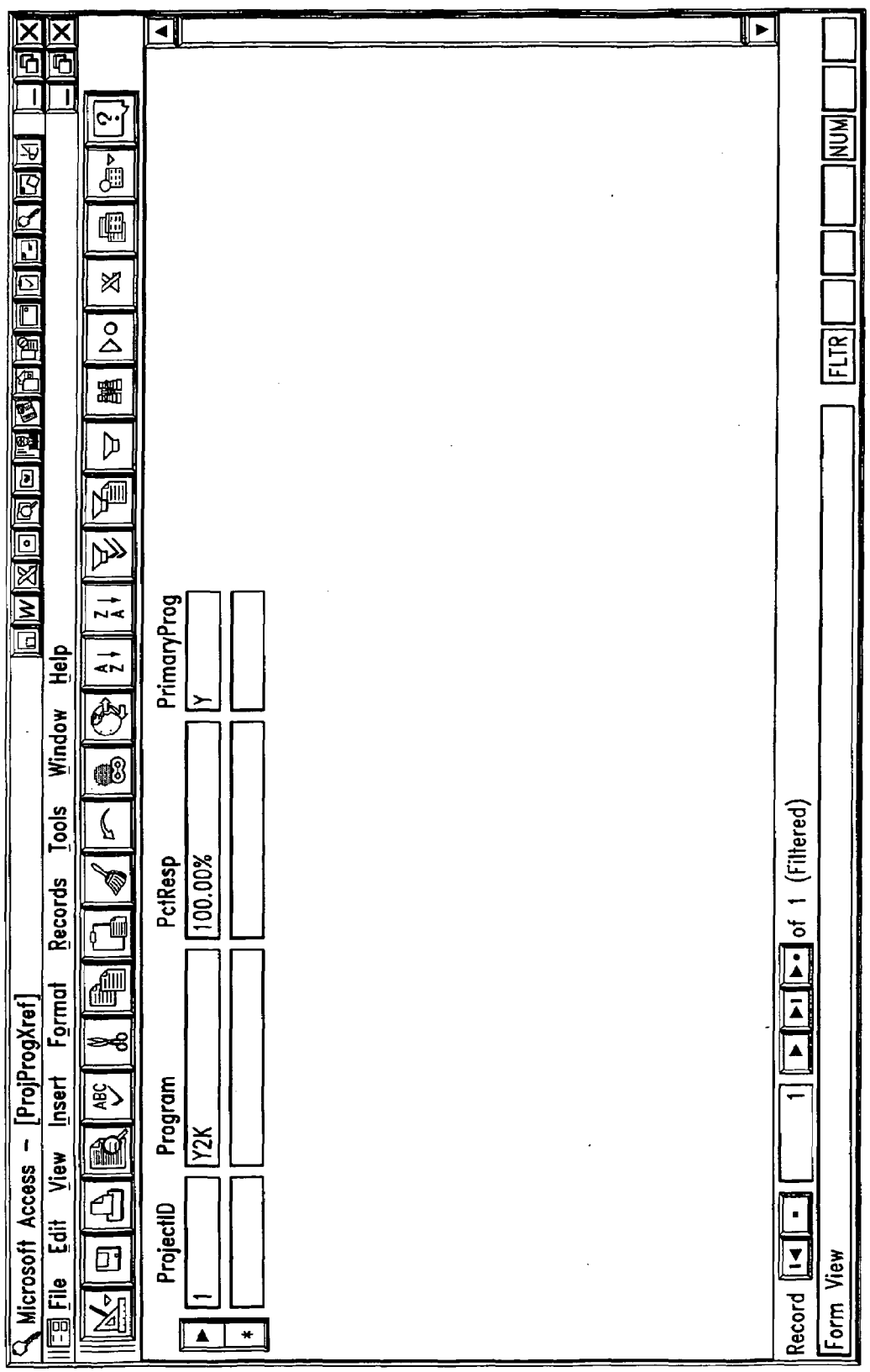
FIG. 29 is an exemplary view of a screen for entering project and program cross-reference data via the program office interface.
Figure 30:
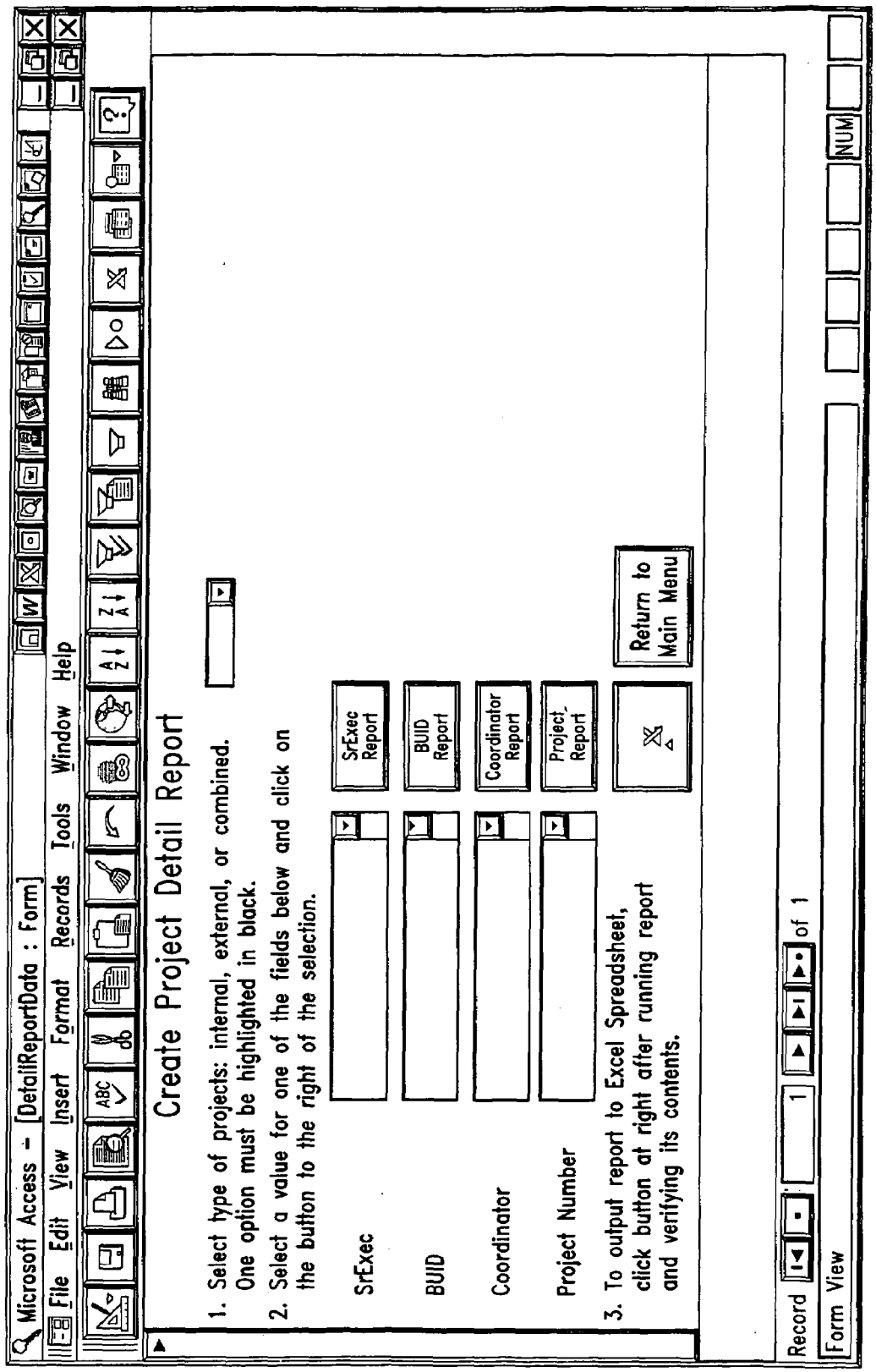
FIG. 30 is an exemplary view of a screen for creating a project detail report via the program office interface.

FIG. 26 is an exemplary screen to display project forecasts in program office interface 13. FIG. 27 is an exemplary screen to display milestone dates. FIG. 28 is an exemplary screen to display milestone actuals. FIG. 29 is an exemplary screen to display project program cross references including the percentage ownership data. FIG. 30 is an exemplary screen to create project detail report. Ad hoc reports may be easily created by using SQL queries on the data fields of the data tables shown in FIG. 21.

The program office management system and method of the present invention provide many strategic advantages. One advantage is the ability to monitor projects managed under non-identical project management methodologies and data sources. Milestones unique to particular projects may be translated to industry standard milestones used in the present invention. Organizational costs, schedules and resources can be managed and controlled across the organization on many levels. Further, access to system data is securely and strictly controlled based on a user's identifier, the user's role(s), and authorization levels. Yet another advantage of the present invention is the ability to archive project history with minimal data storage. Priority in terms of empirical figures and value judgment weights can be assigned to projects in the entire organization to intelligently allocate resources.

It may be advantageous to note that the nomenclature of the detailed description is represented largely in terms of processes and symbolic representations of operations by conventional computer components, such as a central processing unit ("CPU") or processor associated with a general purpose computer system, memory storage devices for the processor, and connected pixel-oriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this detailed description, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, texts, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, or the like, which are often associated with manual operations performed by a human operator. It must be understood that no involvement of the human operator may be necessary, or even desirable, in the present invention. The operations described herein are machine operations performed in conjunction with the human operator or user that interacts with the computer or computers.

In addition, it should be understood that the programs, processes, methods, and the like, described herein are but an example of one implementation of the present invention and are not related or limited to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hardwired logic or programs stored in non-volatile memory, such as read only memory (ROM).

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A program office management system, comprising computer software stored on a computer readable storage medium and operable to:
   store, in a program office database, informational data associated with accounts, projects, and programs;
   store, in the program office database, financial data associated with the accounts, projects, and programs;
   store, in the program office database, schedule and progress data associated with the accounts, projects, and programs;
   store, in the program office database, data associated with personnel, roles, and security access information thereof;
   store, in the program office database, a plurality of predefined tactics wherein each of the plurality of predefined tactics comprises an approach taken to affect change on a project;
   associate one or more predetermined project milestone categories with at least some of the plurality of predefined tactics;
   store, in the program office database, update data associated with the progress, actual expenditures, and labor resources of the projects and programs;
   wherein the data associated with the security access information of personnel comprise a role definition of a coordinator having authorization to assign one or more persons to the at least one business unit, assign at least one role to each person, and add projects and accounts for the at least one business unit;
   wherein the data associated with the security access information of personnel comprise a role table operable to store at least one valid role, and an authorization hierarchical organization of the at least one valid role, wherein the authorization hierarchical organization is associated with increasing levels of data access;
   wherein the data associated with the security access information of personnel associates at least one of the valid roles relevant to the project to each person;
   display data stored in the program office database according to a predetermined security scheme based on the security access information stored in the program office database;
   upon selection of a first tactic, comprising one of the plurality of predefined tactics, by a user for use on a particular project, automatically associating with the particular project at least one milestone having a particular milestone category that was previously associated with the first tactic; and
   receive the update data on a periodic basis.

2. The system, as set forth in claim 1, wherein the program office database comprises a plurality of relational data structures.

3. The system, as set forth in claim 1, comprising at least one user interface that is operable to display the data in the program office database and receive the update data, the at least one user interface comprising at least one web-based user interface.

4. The system, as set forth in claim 1, comprising at least one user interface that is operable to display the data in the program office database and receive the update data, the at least one user interface comprising at least one self-extracting executable user interface.

5. The system, as set forth in claim 1, comprising at least one user interface that is operable to display the data in the program office database and receive the update data, the at least one user interface comprising at least one program office interface.

6. The system, as set forth in claim 1, wherein the program office database comprises more than one copy of the data residing in more than one distributed databases.

7. The system, as set forth in claim 1, comprising at least one user interface that is operable to display the data in the program office database and receive the update data, the at least one user interface comprising more than one copy of the user interface residing in more than one distributed computing system.

8. The system, as set forth in claim 1, wherein the data associated with security access information of personnel comprise an assignment table associating a person to at least one role defined within a business unit.

9. The system, as set forth in claim 1, wherein the data associated with security access information of personnel comprise an assignment table associating a person to at least one role defined within a business unit, and further to at least one predefined update authority level set by a person having a senior management role within the business unit.

10. The system, as set forth in claim 1, wherein the data associated with security access information of personnel comprise a role definition of an account manager capable of having authorization to update account data and project data.

11. The system, as set forth in claim 1, wherein the data associated with security access information of personnel comprise a role definition of a project manager capable of having authorization to update project data.

12. The system, as set forth in claim 1, comprising a data table operable to map milestones predefined in a project to milestone categories predefined within the program office database.

13. The system, as set forth in claim 1, wherein the financial data comprise:
 a project forecast table operable to store at least one current budget forecast amount for the project; and
 a project forecast history table operable to store an original budget forecast amount if it is different than the at least one current budget forecast amount.

14. The system, as set forth in claim 1, wherein the financial data comprise:
 an account forecast table operable to store at least one revenue and expense budget amount associated with an account; and
 an account actual table operable to store at least one revenue and expense actual amount associated with the account.

15. The system, as set forth in claim 1, wherein the informational data comprise a project table operable to store informational data associated with at least one project identified by a project identifier.

16. The system, as set forth in claim 15, wherein the project table comprises:
 a project identifier uniquely identifying each project;
 a business unit identifier of a business unit to which the project belongs to;
 at least one person identifier of a person assigned a role having a predetermined responsibility for the project; and
 a status flag indicative of whether the project is active, pending, or inactive.

17. The system, as set forth in claim 1, wherein the informational data include an account table comprising:
 an account identifier uniquely identifying each account;
 a business unit identifier of a business unit to which the account belongs to; and
 a person identifier of a person assigned the role of an account manager for the account.

18. The system, as set forth in claim 1, wherein the schedule and progress data comprise a milestone actual table operable to store an amount of progress into a specific milestone for a given period for a project.

19. The system, as set forth in claim 1, wherein the schedule and progress data comprise:
 a project identifier of a project;
 a milestone defined for the project;
 a reporting period; and
 a percentage completion value of the milestone in the reporting period independent of forecast or actuals.

20. The system, as set forth in claim 1, wherein the update data comprise:
 a project actual table operable to store actual expenditure amounts spent during a specific reporting period for a project; and
 a milestone actual table operable to store a percentage completion value of a specific milestone defined for a project during the specific reporting period.

21. The system, as set forth in claim 19, wherein the update data further comprise an account actual table operable to store actual expenditure amounts spent during the specific reporting period for an account.

22. The system, as set forth in claim 1, wherein the program office database further comprises a user weight table operable to store a weight value indicative of importance for each system affected by the projects and programs.

23. The system, as set forth in claim 1, wherein the program office database further comprises a project roadblock table operable to store information about a problem encountered in a project identified by a project identifier and to enable escalated reporting to upper management about unresolved problems.

24. The system, as set forth in claim 23, wherein the project roadblock table comprises:
 roadblock type;
 date and time that the problem was encountered; and
 data on how and when the problem was resolved.

25. The system, as set forth in claim 1, wherein the program office database further comprises a transaction log table operable to record what changes were made to data stored in the program office database, who made the changes, and when the changes where made.

26. The system, as set forth in claim 1, wherein the program office database comprises required data, audit data, program objective specific data, and optional data.

27. A method of managing a program office, comprising:
 storing and accessing data associated with at least one project in a program office database, including informational data, financial data, schedule and progress data associated with the at least one project;
 storing update data associated with the at least one project;
 identifying persons associated with the at least one project, defining a role hierarchy having roles associated with increasing levels of data access, assigning at least one role relevant to the at least one project to each person, and storing data associated with the persons and their assigned roles in the program office database;
 wherein assigning at least one role comprises assigning a role of coordinator, a role having authority to add people for a respective business unit, assign some roles to people, and add projects and accounts of a business unit;
 storing a plurality of predefined tactics, wherein each of the plurality of predefined tactics comprises an approach taken to affect change on a project;
 associating one or more predetermined project milestone categories with at least some of the plurality of predefined tactics; and
 upon selection of a first tactic, comprising one of the plurality of predefined tactics, by a user for use on a particular project, automatically associating with the particular project at least one milestone having a particular milestone category that was previously associated with the first tactic.

28. The method, as set forth in claim 27, wherein identifying persons further comprises assigning an update authorization level to each person by a person having a senior management role.

29. The method, as set forth in claim 28, further comprising restricting and permitting viewing, changing and adding data in the program office database according to the assigned role to each person, rules defined in the program office database, and update authorization level assigned to each person.

30. The method, as set forth in claim 27, wherein assigning at least one role comprises assigning at least one role from the role hierarchy to each person, the roles having increasing capability to access and modify program office database data.

31. The method, as set forth in claim 27, wherein assigning at least one role comprises assigning a role of account manager, a role capable of having authority to update project and account data for a respective account.

32. The method, as set forth in claim 27, wherein assigning at least one role comprises assigning a role of project manager, a role capable having authority to update project data for a respective project.

33. The method, as set forth in claim 27, wherein storing and accessing data comprise storing and accessing data stored in at least one relational database.

34. The method, as set forth in claim 27, wherein storing and accessing data associated with the persons and their assigned roles comprise:
storing and accessing an assignment table associating a person identifier to at least one role defined within a specific business unit; and
granting at least one predefined update authority to the person identifier by a person having a predetermined upper management role.

35. The method, as set forth in claim 27, wherein storing and accessing data associated with the persons and their assigned roles comprise storing and accessing a role table having at least one valid role and an authorization hierarchical organization of the at least one valid role.

36. The method, as set forth in claim 27 further comprising storing and accessing a data table associating a milestone to the at least one tactic.

37. The method, as set forth in claim 27, wherein storing and accessing the financial data comprise:
storing and accessing a project forecast table having at least one current budget forecast amount for the project; and
storing and accessing a project forecast history table operable to store an initial budget forecast amount if it is different than the at least one current budget forecast amount.

38. The method, as set forth in claim 27, wherein storing and accessing the financial data comprise:
storing and accessing an account forecast table operable to store at least one revenue and expense budget amount associated with an account; and
storing and accessing an account actual table operable to store at least one revenue and expense actual amount associated with the account.

39. The method, as set forth in claim 27, wherein storing and accessing the informational data comprise:
storing and accessing a project table operable to store informational data associated with at least one project identified by a project identifier; and
storing and accessing an account table operable to store informational data associated with at least one account identified by an account identifier.

40. The method, as set forth in claim 39, wherein storing and accessing the project table comprise:
storing a project identifier uniquely identifying each project and using the project identifier as a primary key to the project table;
storing and accessing a business unit identifier of a business unit to which the project belongs to;
storing and accessing a person identifier of a person assigned at least one role for the project; and
storing and accessing a status flag indicative of whether the project is active, pending, or inactive.

41. The method, as set forth in claim 39, wherein storing and accessing the account table comprise:
storing and accessing an account identifier uniquely identifying each account;
storing and accessing a business unit identifier of a business unit to which the account belongs to; and
storing and accessing a person identifier of a person assigned the role of an account manager for the account.

42. The method, as set forth in claim 27, wherein storing and accessing the schedule and progress data comprise storing and accessing a milestone actual table having an amount of progress into a specific milestone for a given period for a project.

43. The method, as set forth in claim 27, wherein storing and accessing the schedule and progress data comprise:
storing and accessing a project identifier of a project;
storing and accessing a milestone defined for the project;
storing and accessing a reporting period; and
storing and accessing a percentage completion value of the milestone in the reporting period.

44. The method, as set forth in claim 27, wherein storing and accessing the update data comprise:
storing and accessing a project actual table having actual expenditure amounts spent during a specific reporting period for a project; and
storing and accessing a milestone actual table having a percentage completion value of a specific milestone defined for a project during the specific reporting period.

45. The method, as set forth in claim 44, wherein storing and accessing the update data further comprise storing and accessing an account actual table having actual expenditure amounts spent during the specific reporting period for an account.

46. The method, as set forth in claim 27, further comprising storing and accessing a user weight table having a weight value indicative of importance for each system affected by the projects and programs.

47. The method, as set forth in claim 27, further comprising:
storing and accessing a project roadblock table having information about a problem encountered in a project identified by a project identifier; and
reporting any problem to management unresolved after a predetermined time period.

48. The method, as set forth in claim 47, wherein storing and accessing the project roadblock table comprise:
storing and accessing a roadblock type;
storing and accessing a date and time that the problem was encountered; and
storing and accessing data on how and when the problem was resolved.

49. The method, as set forth in claim 27, further comprising storing and accessing a transaction log table having what changes were made to data stored in the program office database, who made the changes, and when the changes where made.

50. The method, as set forth in claim 28, wherein storing and accessing the data comprise storing and accessing data via a web browser-based user interface implementing a security scheme using the role and update authorization level assignment to the users.

51. The method, as set forth in claim 28, wherein storing and accessing update data comprise storing the update data via a self-extracting spread sheet-based user interface implementing a security scheme using the role and update authorization level assignment to the users.

52. The method, as set forth in claim 27, further comprising:

retrieving data from at least one data source other than the program office database; and verifying data in the program office database with the data from the at least one data source other than the program office database.

53. The method, as set forth in claim 27, further comprising:

retrieving data from at least one project management tool; and using the data from the at least one project management tool in views, reports, and audits.

54. The method, as set forth in claim 27, further comprising:

retrieving data from at least one project management tool; and storing the data from the at least one project management tool in the program office database.

55. A system for managing at least one program including a plurality of projects, comprising computer software stored on a computer readable storage medium and operable to:

store informational data associated with projects and programs;

store financial data associated with the projects and programs;

store schedule and progress data associated with the projects and programs;

store personnel data associated with persons having responsibility associated with the projects and programs, the personnel data including a unique person identifier for each person;

store security data having an assignment of at least one role to each person and an assignment of at least one update authorization to certain persons having oversight responsibility;

store a plurality of predefined tactics wherein each of the plurality of predefined tactics comprises an approach taken to affect change on a project;

associate one or more predetermined project milestone categories with at least some of the plurality of predefined tactics;

store update data associated with the progress, actual expenditures, and labor resources of the projects and programs;

wherein the data associated with the security access information of personnel comprise a role definition of a coordinator having authorization to assign one or more persons to the at least one business unit, assign at least one role to each person, and add projects and accounts for the at least one business unit;

display and allow access to the data stored in the program office according to a predetermined security scheme based on the person identifier, role and update authorization assignment stored in the at least one program office database;

upon selection of a first tactic, comprising one of the plurality of predefined tactics, by a user for use on a particular project, automatically associating with the particular project at least one milestone having a particular milestone category that was previously associated with the first tactic; and receive the update data on a periodic basis.

\* \* \* \* \*